US010930903B2

(12) United States Patent
Mitsuyasu et al.

(10) Patent No.: US 10,930,903 B2
(45) Date of Patent: Feb. 23, 2021

(54) BATTERY HOLDER

(71) Applicant: Shimano Inc., Osaka (JP)

(72) Inventors: Kento Mitsuyasu, Osaka (JP); Shinichiro Noda, Osaka (JP)

(73) Assignee: Shimano Inc., Osaka (JP)

(*) Notice: Subject to any disclaimer, the term of this patent is extended or adjusted under 35 U.S.C. 154(b) by 147 days.

(21) Appl. No.: 16/235,173

(22) Filed: Dec. 28, 2018

(65) Prior Publication Data
US 2019/0229307 A1    Jul. 25, 2019

(30) Foreign Application Priority Data

Jan. 19, 2018 (JP) .............................. JP2018-007294
Sep. 19, 2018 (JP) .............................. JP2018-174849

(51) Int. Cl.
*H01M 2/10* (2006.01)
*B62M 6/90* (2010.01)
*B62M 6/55* (2010.01)

(52) U.S. Cl.
CPC .............. *H01M 2/105* (2013.01); *B62M 6/90* (2013.01); *H01M 2/1072* (2013.01); *B62M 6/55* (2013.01); *H01M 2220/20* (2013.01)

(58) Field of Classification Search
CPC ................................................ B62M 6/40–90
See application file for complete search history.

(56) References Cited

U.S. PATENT DOCUMENTS

| 2006/0088758 | A1* | 4/2006 | Wu | B62K 19/30 |
| | | | | 429/97 |
| 2013/0241170 | A1* | 9/2013 | Talavasek | B62K 19/40 |
| | | | | 280/279 |
| 2015/0122562 | A1* | 5/2015 | Miyashiro | B60R 16/0215 |
| | | | | 180/68.5 |

FOREIGN PATENT DOCUMENTS

JP          9-226653 A     9/1997

* cited by examiner

*Primary Examiner* — Maria Laios
*Assistant Examiner* — George Kim
(74) *Attorney, Agent, or Firm* — Global IP Counselors, LLP

(57) ABSTRACT

A battery holder is configured to appropriately hold a battery unit. The battery holder includes a first holding portion that supports a first end of a battery unit while in an installed state where the battery unit is held by the battery holder. The first holding portion includes a movable member and a first biasing member. The movable member includes a first support surface that contacts the first end of the battery unit while in the installed state. The movable member is movable relative to a frame of a human-powered vehicle while in a mounted state where the battery holder is mounted to the frame of the human-powered vehicle. The first biasing member biases the movable member toward the battery unit.

27 Claims, 12 Drawing Sheets

BATTERY HOLDER

CROSS-REFERENCE TO RELATED APPLICATIONS

This application claims priority to Japanese Patent Application Nos. 2018-007294, filed on Jan. 19, 2018, and 2018-174849, filed on Sep. 19, 2018. The entire disclosures of Japanese Patent Application Nos. 2018-007294 and 2018-174849 are hereby incorporated herein by reference.

BACKGROUND

Technical Field

The present disclosure generally relates to a battery holder.

Background Information

A known battery holder holds a battery unit mounted on a human-powered vehicle. The battery holder is coupled to a frame of a human-powered vehicle. The battery holder holds a battery unit to provide a state allowing the battery unit to supply electric power to various electrical elements mounted on the human-powered vehicle. Japanese Laid-Open Patent Publication No. 9-226653 (Patent document 1) discloses one example of a typical battery holder.

SUMMARY

Depending on manufacturing tolerance of a battery unit, a gap between the battery unit and a battery holder can hinder the battery holder from appropriately holding the battery unit. An object of the present disclosure is to provide a battery holder that appropriately holds a battery unit.

A battery holder according to a first aspect of the present disclosure comprises a first holding portion that supports a first end of a battery unit while in an installed state where the battery unit is held by the battery holder. The first holding portion includes a movable member and a first biasing member. The movable member includes a first support surface that contacts the first end of the battery unit while in the installed state. The movable member is movable relative to a frame of a human-powered vehicle while in a mounted state where the battery holder is mounted to the frame of the human-powered vehicle. The first biasing member biases the movable member toward the battery unit.

In accordance with the first aspect of the battery holder, the movable member is biased by the first biasing member so that the first support surface of the movable member contacts the first end of the battery unit. This limits formation of a gap between the battery unit and the battery holder. Thus, the battery unit is appropriately held.

In accordance with a second aspect of the present disclosure, the battery holder according to the first aspect is configured so that the first holding portion further includes a base member attached to the frame of the human-powered vehicle while in the mounted state, and the first biasing member is provided between the base member and the movable member.

In accordance with the second aspect of the battery holder, the first biasing member is held between the base member and the movable member.

In accordance with a third aspect of the present disclosure, the battery holder according to the second aspect is configured so that the first holding portion further includes a support structure that supports the first biasing member between the base member and the movable member.

In accordance with the third aspect of the battery holder, the first biasing member is appropriately held between the base member and the movable member.

In accordance with a fourth aspect of the present disclosure, the battery holder according to the third aspect is configured so that the support structure includes a first support provided on the movable member and a second support provided on the base member.

In accordance with the fourth aspect of the battery holder, the first biasing member is appropriately held between the base member and the movable member.

In accordance with a fifth aspect of the present disclosure, the battery holder according to the fourth aspect is configured so that the movable member is movable relative to the frame of the human-powered vehicle in a first direction that extends in a longitudinal direction of the battery unit while in the mounted state. The movable member further includes a pair of first sides facing each other in a second direction that is perpendicular to the first direction. The base member includes a pair of second sides facing each other in the second direction. The first support is provided on each of the first sides. The second support is provided on each of the second sides.

In accordance with the fifth aspect of the battery holder, the first biasing member is provided on a side of the first holding portion. This ensures space for accommodating an element other than the first biasing member in the first holding portion.

In accordance with a sixth aspect of the present disclosure, the battery holder according to any one of the second to fifth aspects further comprises a coupling structure that couples the movable member and the base member so that the movable member is movable relative to the base member.

In accordance with the sixth aspect of the battery holder, in a state in which the movable member is movable relative to the base member, the movable member can be coupled to the base member.

In accordance with a seventh aspect of the present disclosure, the battery holder according to the sixth aspect is configured so that the coupling structure includes a first coupling portion and a second coupling portion, and the first coupling portion and the second coupling portion are coupled together to couple the movable member and the base member.

In accordance with the seventh aspect of the battery holder, in a state in which the movable member is movable relative to the base member, the movable member can be coupled to the base member.

In accordance with an eighth aspect of the present disclosure, the battery holder according to the seventh aspect is configured so that the first coupling portion is provided on the movable member, and the second coupling portion is provided on the base member.

In accordance with the eighth aspect of the battery holder, in a state in which the movable member is movable relative to the base member, the movable member can be coupled to the base member.

In accordance with a ninth aspect of the present disclosure, the battery holder according to the eighth aspect is configured so that at least one of the first coupling portion and the second coupling portion includes a snap-fit.

In accordance with the ninth aspect of the battery holder, the movable member is coupled to the base member without using a coupling member such as a bolt. Thus, the movable member is easily coupled to the base member.

In accordance with a tenth aspect of the present disclosure, the battery holder according to any one of the second to ninth aspects is configured so that the first holding portion further includes a guide structure that guides movement of the movable member.

In accordance with the tenth aspect of the battery holder, movement of the movable member in a direction differing from the movement direction is restricted.

In accordance with an eleventh aspect of the present disclosure, the battery holder according to the tenth aspect is configured so that the guide structure includes a groove provided on one of the movable member and the base member and an insertion portion provided on the other one of the movable member and the base member, and the insertion portion is inserted into the groove so that the movable member moves relative to the base member.

In accordance with the eleventh aspect of the battery holder, movement of the movable member in a direction differing from the movement direction is restricted.

In accordance with a twelfth aspect of the present disclosure, the battery holder according to any one of the second to eleventh aspects is configured so that the movable member further includes a first facing surface that faces the base member, the base member includes a second facing surface that faces the movable member, and the first facing surface and the second facing surface are spaced apart by a gap in a state in which the battery unit is not held by the first holding portion.

In accordance with the twelfth aspect of the battery holder, the first biasing member is compressed in accordance with force received form the battery unit. This allows the movable member to move relative to the base member in a range of a gap. More specifically, compression of the first biasing member ensures that the movable member moves relative to the base member by an amount corresponding to the gap. This allows the movable member to move relative to the base member in accordance with manufacturing tolerance of the battery unit. Thus, the battery unit is appropriately held.

In accordance with a thirteenth aspect of the present disclosure, the battery holder according to any one of the second to twelfth aspects is configured so that the first holding portion further includes a movement restriction member provided between the movable member and the base member in a third direction perpendicular to a first direction that extends in a longitudinal direction of the battery unit to restrict movement of the movable member in the third direction.

In accordance with the thirteenth aspect of the battery holder, movement of the movable member in the third direction is restricted. Additionally, the movable member is not in direct contact with the base member in the third direction. This reduces noise caused by contact of the movable member with the base member.

In accordance with a fourteenth aspect of the present disclosure, the battery holder according to the thirteenth aspect is configured so that the movable member further includes a first contact surface that contacts the movement restriction member, and the movement restriction member is provided on the base member to slide along the first contact surface in accordance with movement of the movable member in the first direction.

In accordance with the fourteenth aspect of the battery holder, in a state in which the movable member is in contact with the movement restriction member, the movable member is movable in the first direction.

In accordance with a fifteenth aspect of the present disclosure, the battery holder according to the fourteenth aspect is configured so that the first contact surface is shaped as an arc that projects from the movable member toward the base member as viewed in a direction perpendicular to the first direction and the third direction.

In accordance with the fifteenth aspect of the battery holder, friction caused by contact of the first contact surface of the movable member with the movement restriction member is reduced. Thus, the movable member is smoothly movable in the first direction. Additionally, in accordance with the fifteenth aspect of the battery holder, the movable member can easily move about an axis parallel to a direction perpendicular to the first direction and the third direction.

In accordance with a sixteenth aspect of the present disclosure, the battery holder according to any one of the thirteenth to fifteenth aspects is configured so that the movement restriction member is elastic.

In accordance with the sixteenth aspect of the battery holder, noise caused by contact of the movement restriction member with another element is reduced.

In accordance with a seventeenth aspect of the present disclosure, the battery holder according to the sixteenth aspect is configured so that the movement restriction member includes rubber.

In accordance with the seventeenth aspect of the battery holder, noise caused by contact of the movement restriction member with another element is reduced.

In accordance with an eighteenth aspect of the present disclosure, the battery holder according to any one of the first to seventeenth aspects is configured so that the movable member further includes a connector connected to a terminal provided on the first end of the battery unit while in the installed state.

In accordance with the eighteenth aspect of the battery holder, the movable member is biased by the first biasing member. Thus, the first support surface of the movable member continues to be in contact with the first end of the battery unit. This maintains a state in which the connector of the movable member is connected to the terminal of the battery unit.

In accordance with a nineteenth aspect of the present disclosure, the battery holder according to any one of the first to eighteenth aspects is configured so that the movable member further includes an engagement portion that is engaged with the first end of the battery unit while in the installed state.

In accordance with the nineteenth aspect of the battery holder, the first end of the battery unit is engaged with the engagement portion of the movable member. This holds the position of the battery unit with respect to the first holding portion.

In accordance with a twentieth aspect of the present disclosure, the battery holder according to any one of the first to nineteenth aspects is configured so that the first biasing member includes a first elastic member.

In accordance with the twentieth aspect of the battery holder, the first biasing member stably applies biasing force to the movable member.

In accordance with a twenty-first aspect of the present disclosure, the battery holder according to the twentieth aspect is configured so that the first elastic member includes rubber.

In accordance with the twenty-first aspect of the battery holder, the first biasing member stably applies biasing force to the movable member.

In accordance with a twenty-second aspect of the present disclosure, the battery holder according to any one of the first to twenty-first aspects further comprises a second holding portion that supports a second end of the battery unit while in the installed state.

In accordance with the twenty-second aspect of the battery holder, the opposite ends of the battery unit are held by the battery holder. Thus, the battery unit is stably held.

In accordance with a twenty-third aspect of the present disclosure, the battery holder according to the twenty-second aspect is configured so that the second holding portion includes a second biasing member that biases the battery unit toward the first holding portion.

In accordance with the twenty-third aspect of the battery holder, the opposite ends of the battery unit are biased by the first biasing member and the second biasing member. This configuration further limits formation of a gap between the battery unit and the battery holder. Thus, the battery unit is appropriately held.

In accordance with a twenty-fourth aspect of the present disclosure, the battery holder according to the twenty-third aspect is configured so that the second holding portion further includes a support member attached to the frame of the human-powered vehicle while in the mounted state, the support member includes a second support surface that contacts the second end of the battery unit while in the installed state, and the second biasing member is provided on the second support surface of the support member.

In accordance with the twenty-fourth aspect of the battery holder, the second biasing member appropriately biases the battery unit toward the first holding portion.

In accordance with a twenty-fifth aspect of the present disclosure, the battery holder according to the twenty-fourth aspect is configured so that the second holding portion further includes a contact member attached to the second biasing member so that a second contact surface contacts the second end of the battery unit while in the installed state, and the second contact surface of the contact member has a lower friction coefficient than the second biasing member.

In accordance with the twenty-fifth aspect of the battery holder, friction caused by contact of the second end of the battery unit with the second contact surface of the contact member is reduced. Thus, the battery unit is easily attached to and removed from the battery holder.

In accordance with a twenty-sixth aspect of the present disclosure, the battery holder according to any one of the twenty-third to twenty-fifth aspects is configured so that the second biasing member includes a second elastic member.

In accordance with the twenty-sixth aspect of the battery holder, the second biasing member stably applies biasing force to the battery unit.

In accordance with a twenty-seventh aspect of the present disclosure, the battery holder according to the twenty-sixth aspect is configured so that the second elastic member includes rubber.

In accordance with the twenty-seventh aspect of the battery holder, the second biasing member stably applies biasing force to the battery unit.

In accordance with a twenty-eighth aspect of the present disclosure, the battery holder according to the twenty-fourth or twenty-fifth aspect is configured so that the second biasing member includes metal that is provided on the second support surface to contact the second end of the battery unit while in the installed state.

In accordance with the twenty-eighth aspect of the battery holder, friction caused by contact of the second end of the battery unit with the second biasing member is reduced. Thus, the battery unit is easily attached to and removed from the battery holder.

According to the present disclosure, the battery holder appropriately holds the battery unit.

BRIEF DESCRIPTION OF THE DRAWINGS

Referring now to the attached drawings which form a part of this original disclosure.

FIG. 1 is a side elevational view of a human-powered vehicle (e.g., a bicycle) including a battery holder in accordance with a first embodiment of.

DETAILED DESCRIPTION OF EMBODIMENTS DISCLOSURE

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three.

First Embodiment

Figure 1:
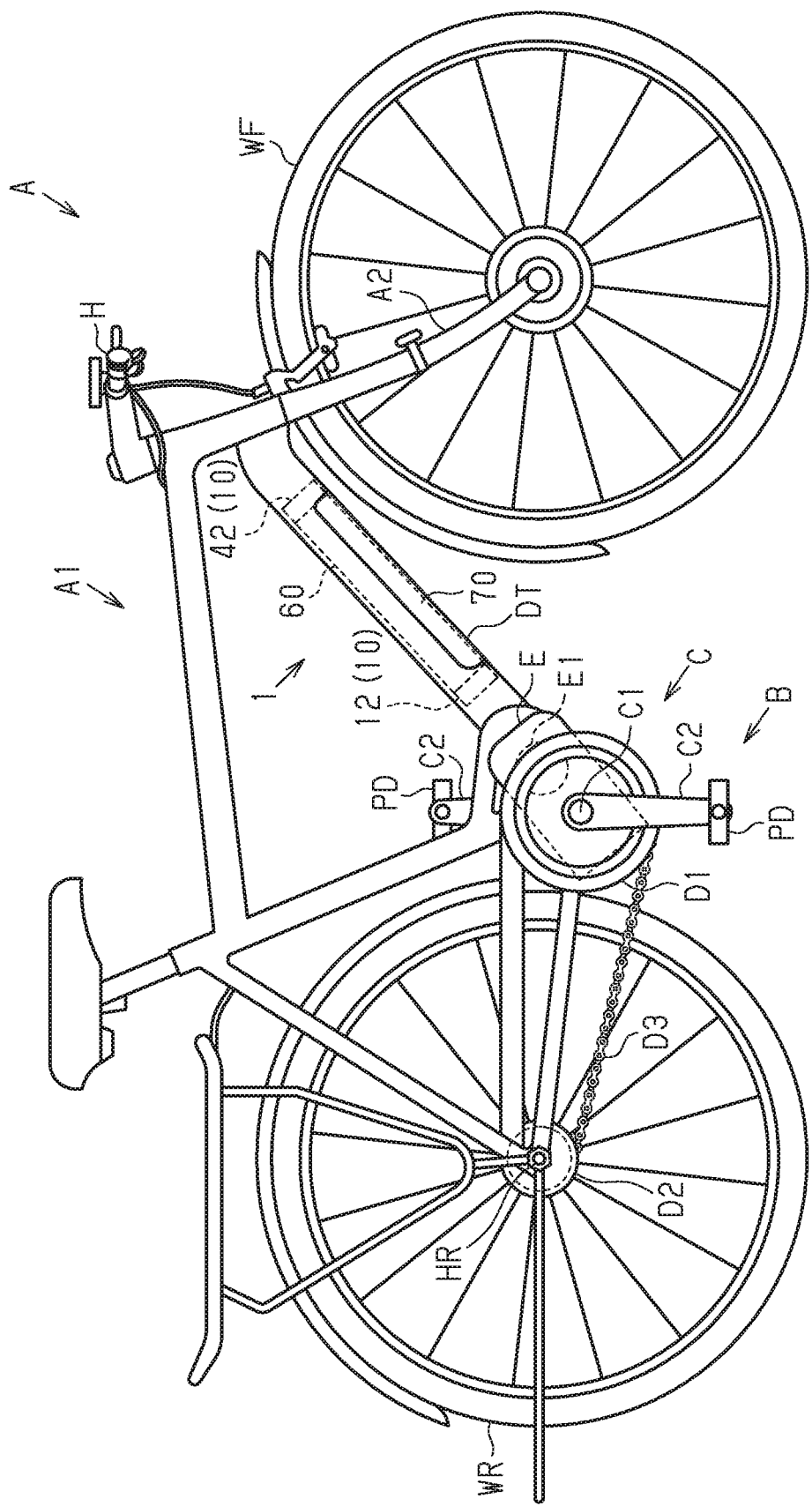

A human-powered vehicle A including a battery holder 10 will now be described with reference to FIG. 1. The human-powered vehicle refers to a vehicle at least partially using human power as driving force for travelling and includes a vehicle electrically assisting human power. The human-powered vehicle does not include a vehicle using only driving force other than human power. In particular, a vehicle using only an internal combustion engine as driving force is not included in the human-powered vehicle. The human-powered vehicle is generally assumed to be a small, light vehicle that does not require a license for driving on a public road. The illustrated human-powered vehicle A is a bicycle (e-bike) including an electrical assist unit E assisting propulsion of the human-powered vehicle A with electrical energy. More specifically, the illustrated human-powered vehicle A is a trekking bike. The human-powered vehicle A further includes a frame A1, a front fork A2, a front wheel WF, a rear wheel WR, a handlebar H, and a drivetrain B.

The drivetrain B includes a drivetrain of a chain-drive type. The drivetrain B includes a crank C, a front sprocket D1, a rear sprocket D2, and a chain D3. The crank C includes a crankshaft C1 rotatably supported by the frame A1 and a pair of crank arms C2 respectively provided on opposite ends of the crankshaft C1. A pedal PD is rotatably coupled to the distal end of each crank arm C2. The drivetrain B can be selected from any type and can be a belt-drive type or a shaft-drive type.

The front sprocket D1 is provided on the crank C to rotate integrally with the crankshaft C1. The rear sprocket D2 is provided on a hub HR of the rear wheel WR. The chain D3 runs around the front sprocket D1 and the rear sprocket D2. Driving force applied to the pedals PD by the user riding the human-powered vehicle A is transmitted via the front sprocket D1, the chain D3, and the rear sprocket D2 to the rear wheel WR.

The human-powered vehicle A further includes the electrical assist unit E. The electrical assist unit E operates to assist propelling force of the human-powered vehicle A. The electrical assist unit E operates, for example, in accordance with driving force applied to the pedals PD. The electrical assist unit E includes an electric motor E1. The electrical assist unit E is driven by electric power supplied from a battery unit 60 mounted on the human-powered vehicle A. The electrical assist unit E can be omitted from the human-powered vehicle A. The battery unit 60 is a battery pack that includes one or more battery cells in a housing.

The human-powered vehicle A further includes a battery component 1. The battery component 1 is provided on the frame A1 of the human-powered vehicle A. In the present embodiment, the battery component 1 is provided on a down tube DT of the frame A1. The battery component 1 is used in a state in which, for example, at least a portion of the battery component 1 is accommodated in an accommodation space DT1 (refer to FIG. 2) of the down tube DT. The down tube DT includes an opening DT2 (refer to FIG. 2) that opens downward in a state in which the human-powered vehicle A is placed on a level ground. The opening DT2 is sized to allow the battery component 1 to be inserted into the accommodation space DT1. The battery component 1 can be provided on a section of the frame A1 different from the down tube DT or can be provided on the front fork A2.

Figure 2:
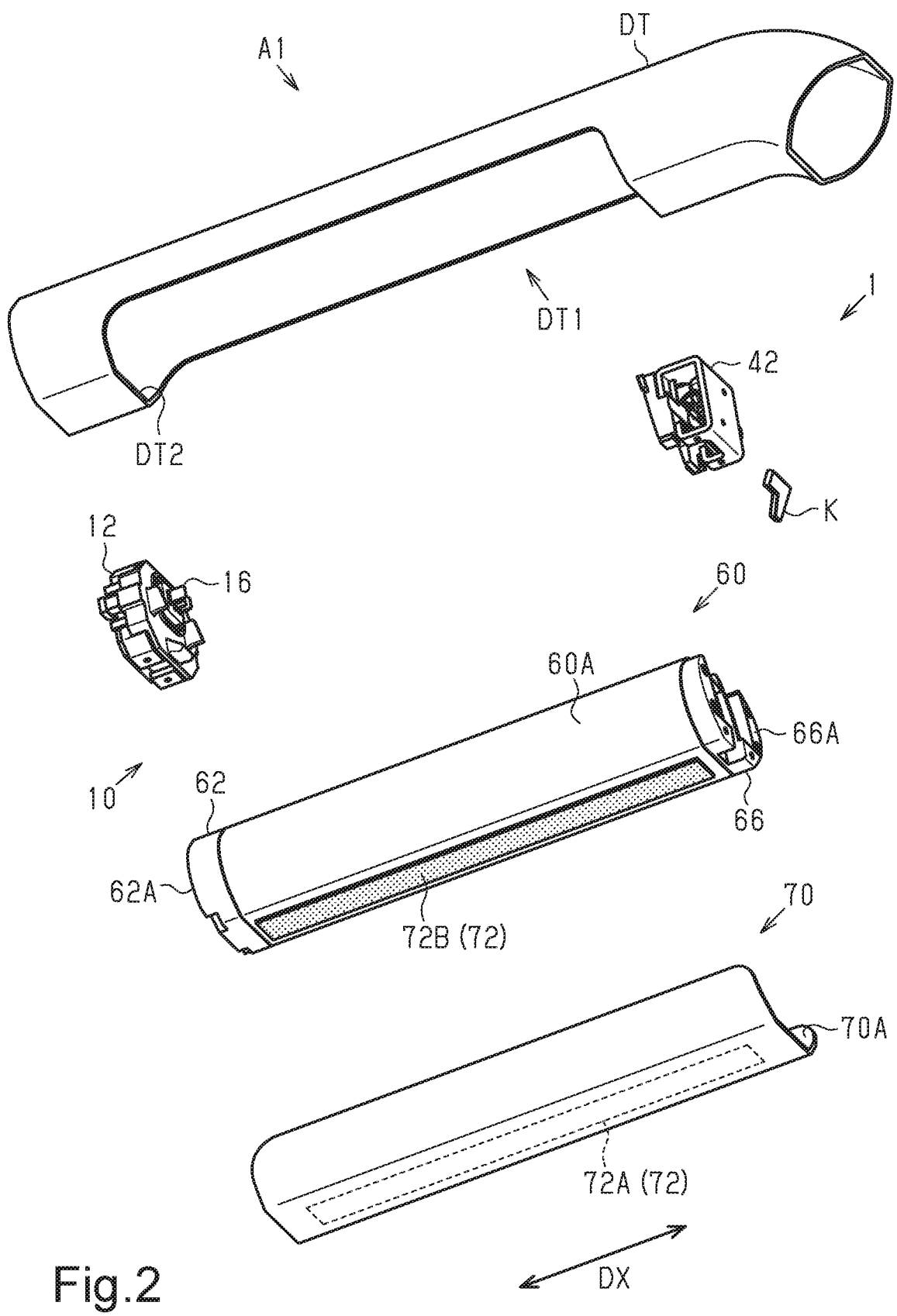
FIG. 2 is an exploded perspective view of a battery component including the battery holder shown in FIG. 1.

The configuration of the battery component 1 will now be described with reference to FIG. 2. The battery component 1 includes the battery holder 10 and the battery unit 60. The battery holder 10 is configured to hold the battery unit 60. The battery holder 10 is coupled to the down tube DT, for example, in a state accommodated in the accommodation space DT1 of the down tube DT. The battery unit 60 accommodates one or more battery cells. The battery unit 60 is elongated and has a cross-sectional shape at least partially conforming to the cross-sectional shape of the down tube DT. The battery unit 60 can be tubular or box-shaped and thus is not limited to the elongated shape. The battery component 1 includes a first end 62 and a second end 66. The first end 62 is one of the longitudinal ends of the battery unit 60. The first end 62 includes a first end surface 62A. The second end 66 is the other longitudinal ends of the battery unit 60. The second end 66 includes a second end surface 66A.

The battery component 1 further includes a cover 70 protecting the battery unit 60 and a cover attachment portion 72 attaching the cover 70 to the battery unit 60. The shape of the cover 70 conforms to the shape of the down tube DT of the human-powered vehicle A. More specifically, the cover 70 is shaped to be substantially flush (seamless) with the down tube DT in a state in which the battery unit 60 is held by the battery holder 10 and the cover 70 is attached to the battery unit 60.

The cover attachment portion 72 includes, for example, a hook-and-loop fastener. The cover attachment portion 72 includes hooks 72A and loops 72B. The hooks 72A are provided, for example, on an inner surface 70A of the cover 70. The loops 72B are provided, for example, on an outer surface 60A of the battery unit 60 at a portion facing the cover 70. The hooks 72A and the loops 72B are coupled to each other to couple the cover 70 to the battery unit 60. In this configuration, the cover 70 is attached to the battery unit 60 with the hook-and-loop fastener. Thus, as compared to a case in which the cover 70 is mechanically coupled to the battery unit 60 with a coupling member such as a bolt, the cover 70 is easily attached to the battery unit 60 as bending of the cover 70 with respect to the down tube DT is corrected. Additionally, the cover 70 is easily attached to and detached from the battery unit 60. In a state in which the battery unit 60 is held by the battery holder 10, the cover 70 is attached to the battery unit 60. As a result, the opening DT2 of the down tube DT is closed by the cover 70.

The battery holder 10 includes a first holding portion 12 that supports the first end 62 of the battery unit 60. The first holding portion 12 is provided, for example, on the down tube DT of the human-powered vehicle A at a rear side of the human-powered vehicle A. The battery holder 10 further includes a second holding portion 42 that supports the second end 66 of the battery unit 60. The second holding portion 42 is provided, for example, on the down tube DT of the human-powered vehicle A at a front side of the human-powered vehicle A. On the down tube DT of the human-powered vehicle AT, the first holding portion 12 can be provided at the front side of the human-powered vehicle A, and the second holding portion 42 can be provided at the rear side of the human-powered vehicle A.

Figure 3:
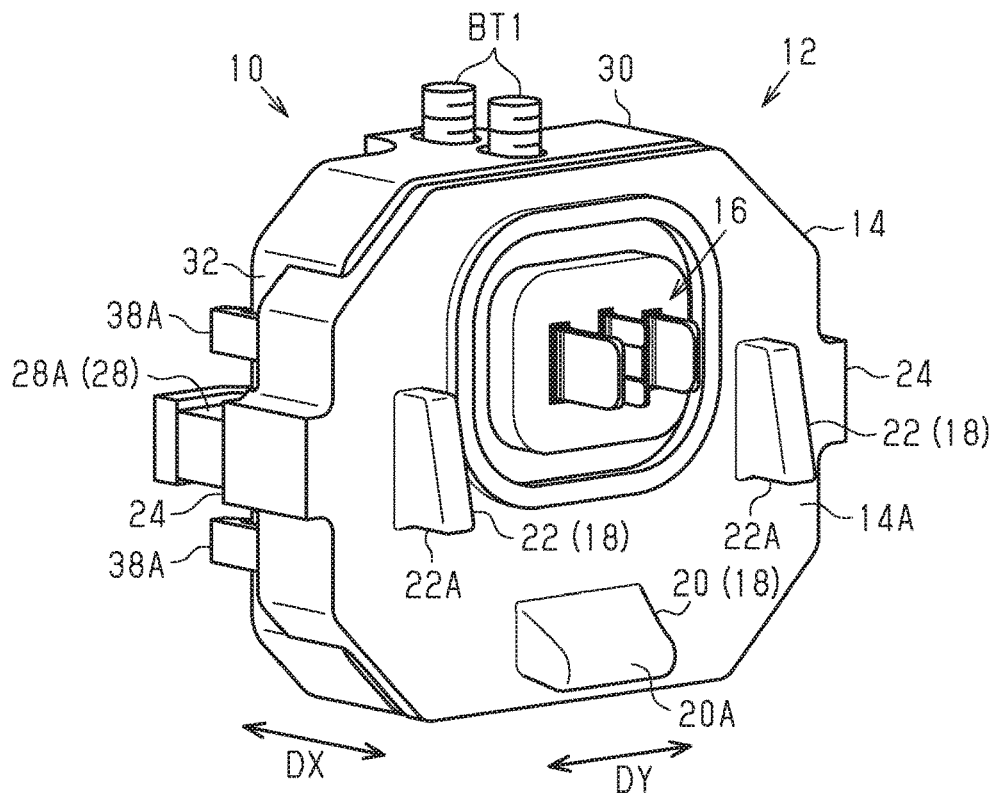
FIG. 3 is a perspective view of a first holding portion of the battery holder shown in FIG. 2.

As shown in FIG. 3, the first holding portion 12 has a first support surface 14A that contacts the first end 62 of the battery unit 60 and includes a movable member 14 movable relative to the frame A1 and a first biasing member 28 biasing the movable member 14 toward the battery unit 60.

The movable member 14 is movable relative to the frame A1 of the human-powered vehicle A in a first direction DX. The first direction DX extends from the first holding portion 12 toward the second holding portion 42. In the present embodiment, the first direction DX extends in a longitudinal direction of the battery unit 60. The movable member 14 further includes a connector 16 connected to a terminal 62B (refer to FIG. 9) provided on the first end 62 of the battery unit 60. The connector 16 is provided to project from the first support surface 14A of the movable member 14. The connector 16 includes a terminal. The terminal of the connector 16 and the terminal 62B are electrical terminals. The terminal 62B is provided on the first end surface 62A of the battery unit 60 (refer to FIG. 9). In an installed state in which the battery holder 10 holds the battery unit 60 so that the terminal 62B of the battery unit 60 is connected to the terminal of the connector 16, the battery unit 60 is electrically connected to various electrical elements mounted on the human-powered vehicle A. The various electrical elements mounted on the human-powered vehicle A are elements powered by the battery unit 60.

The movable member 14 further includes an engagement portion 18 engaged with the first end 62 of the battery unit 60. The engagement portion 18 is provided to project from the first support surface 14A of the movable member 14. The engagement portion 18 includes a projection projecting from the first support surface 14A of the movable member 14. The engagement portion 18 includes a first engagement portion 20 and a pair of second engagement portions 22. The first engagement portion 20 is provided, for example, on the first support surface 14A of the movable member 14 toward the opening DT2 of the down tube DT with respect to the connector 16. In the present embodiment, the first engagement portion 20 is provided at a lower side of the connector 16. In a process of attaching and removing the battery unit 60 to and from the battery holder 10, the first engagement portion 20 is configured to be a pivot point about which the battery unit 60 pivots. The first engagement portion 20 has a round distal end 20A.

The second engagement portions 22 are provided, for example, on the first support surface 14A of the movable member 14 at opposite sides of the connector 16 so that the connector 16 is arranged between the second engagement portions 22. In one example, each of the second engagement portions 22 has a surface toward the opening DT2 (hereafter, referred to as "end surface 22A") extending in the first direction DX (refer to FIG. 4). In a preferred example, the end surface 22A of the second engagement portion 22 is arcuate and recessed from the opening DT2 as viewed in a second direction DY that is perpendicular to the first direction DX. In a further preferred example, the arc center of the end surface 22A of the second engagement portion 22 substantially coincides with a pivot center AR (refer to FIG. 4) of the pivot point of the first engagement portion 20. With this configuration, the attaching and removing of the battery unit 60 to and from the battery holder 10 is smoothly guided, and the battery unit 60 is easily attached to and removed from the battery holder 10. The second engagement portion 22 is formed so that an amount projected from the first support surface 14A decreases from the end closer to the first engagement portion 20 toward the end farther from the first engagement portion 20.

The first holding portion 12 further includes a base member 30 configured to be attached to the frame A1 of the human-powered vehicle A in a mounted state where the battery holder 10 is mounted to the frame A1 of the human-powered vehicle A. The base member 30 is attached to the down tube DT, for example, by two bolts BT1. The first biasing member 28 is provided between the base member 30 and the movable member 14. More specifically, the first biasing member 28 is provided between the base member 30 and the movable member 14 in the first direction DX. The first biasing member 28 biases the movable member 14 so that the movable member 14 moves relative to the base member 30 in the first direction DX. In the present embodiment, the number of first biasing members 28 is two (refer to FIG. 5). Each first biasing member 28 includes a first elastic member 28A. The first elastic member 28A includes rubber. For example, the size of the first biasing member 28 is set in accordance with a range of manufacturing tolerance of the battery unit 60 in the first direction DX. The first elastic member 28A is not limited to rubber and can include other elastic resin materials or a spring such as a plate spring, a torsion spring, or a coil spring. Each first biasing member 28 can include a magnetic material instead of the first elastic member 28A.

Figure 4:
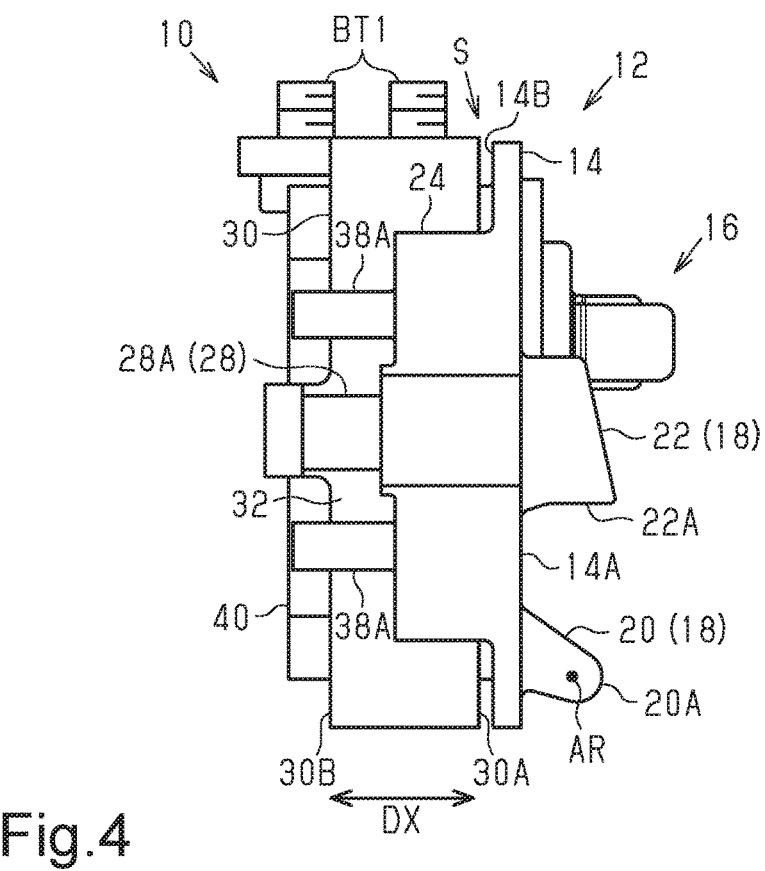
FIG. 4 is a side elevational view of the first holding portion shown in FIG. 2.

As shown in FIG. 4, the movable member 14 further includes a first facing surface 14B facing the base member 30. The first facing surface 14B is opposite to the first support surface 14A in the first direction DX. The base member 30 includes a second facing surface 30A facing the movable member 14. The base member 30 further includes a rear surface 30B opposite to the second facing surface 30A in the first direction DX. In a state in which the battery unit 60 is not held by the first holding portion 12, the first facing surface 14B and the second facing surface 30A are spaced apart by a gap S.

In a state in which the battery unit 60 is not held by the first holding portion 12, the first biasing member 28 extends the most, and the gap S is the largest. In a state in which the battery unit 60 is held by the first holding portion 12, the movable member 14 is moved relative to the base member 30 in a direction reducing the gap S in accordance with the manufacturing tolerance of the battery unit 60 in the first direction DX, and the first biasing member 28 is compressed by force received from the movable member 14. The compression of the first biasing member 28 allows the movable member 14 to move relative to the base member 30 maximally in the range of the gap S.

Figure 5:
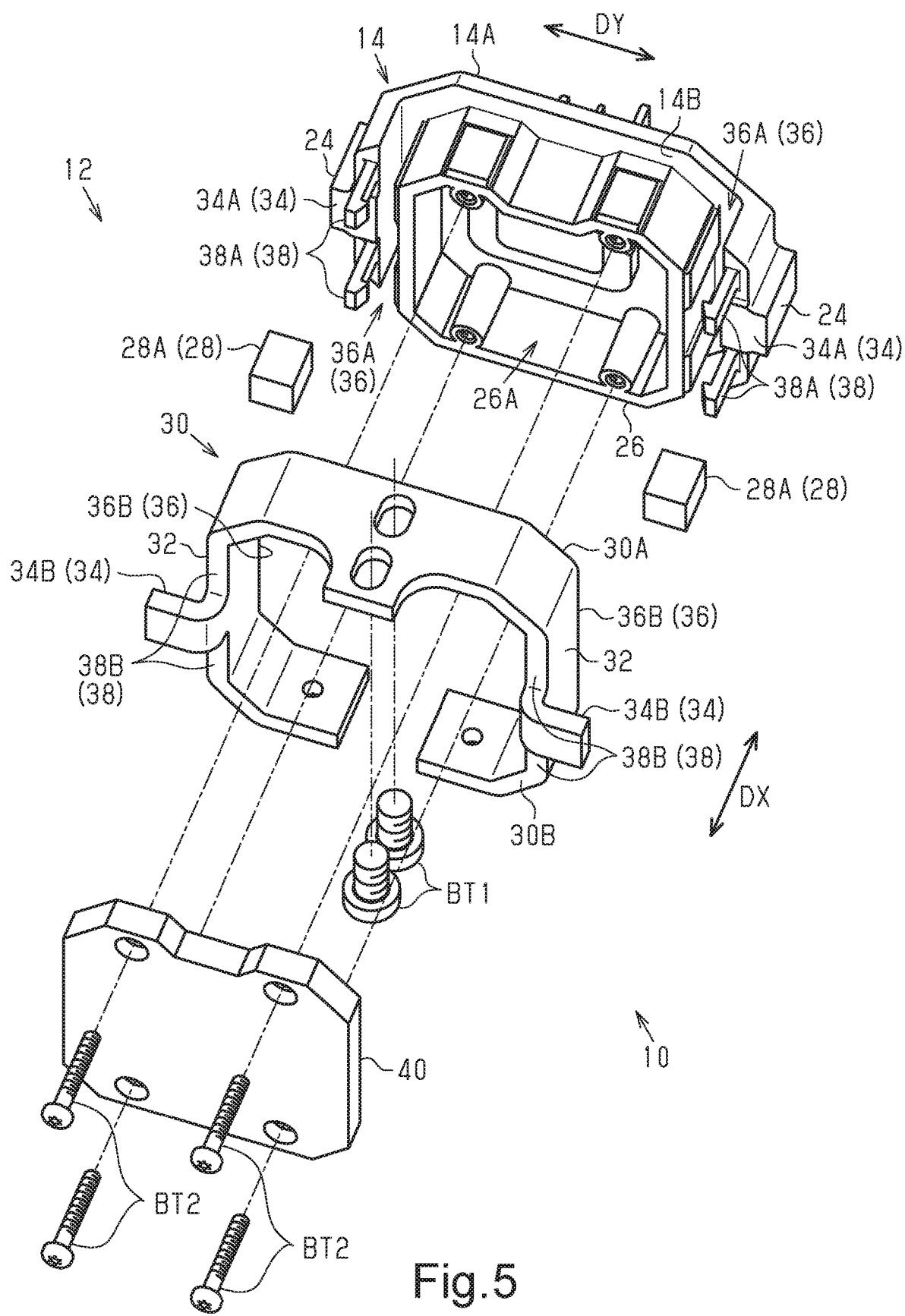
FIG. 5 is an exploded perspective view of the first holding portion shown in FIG. 2.

As shown in FIG. 5, the movable member 14 further includes a pair of first sides 24 facing each other in the second direction DY, which is perpendicular to the first direction DX extending in the longitudinal direction of the battery unit 60. The first sides 24 are provided to project from edges of the first facing surface 14B toward the base member 30. The first sides 24 are provided at opposite ends of the movable member 14 in the second direction DY. The first sides 24 partially include respective opposite side walls of the movable member 14 in the second direction DY. The movable member 14 further includes a surrounding wall 26 provided on the first facing surface 14B to define an inner space 26A configured to accommodate, for example, an electrical wire and an electrical substrate connected to the terminal of the connector 16. The surrounding wall 26 is provided at an inner side of the first sides 24 in the second direction DY. The base member 30 is configured to surround the surrounding wall 26 of the movable member 14. The base member 30 further includes a pair of second sides 32 facing each other in the second direction DY.

The first holding portion 12 further includes a support structure 34 that supports the first biasing members 28 between the base member 30 and the movable member 14. The support structure 34 includes first supports 34A provided on the movable member 14 and second supports 34B provided on the base member 30. The first supports 34A are respectively provided on the first sides 24. More specifically, the first supports 34A are respectively provided on the first sides 24 at portions facing the base member 30. The second supports 34B are respectively provided on the second sides 32. More specifically, the second supports 34B are respectively provided to project outward from the second sides 32 in the second direction DY.

One of the first biasing members 28 is provided between one of the first supports 34A and one of the second supports 34B. The other one of the first biasing members 28 is provided between the other one of the first supports 34A and the other one of the second supports 34B. For example, each of the first biasing members 28 can be fixed to at least one of the first support 34A and the second support 34B or can be simply held between the first support 34A and the second support 34B. The first biasing member 28 can be fixed to only the first support 34A, only the second support 34B, or both the first support 34A and the second support 34B.

The first holding portion 12 further includes a guide structure 36 that guides movement of the movable member 14. The guide structure 36 includes a pair of grooves 36A and a pair of insertion portions 36B. The grooves 36A are provided on one of the movable member 14 and the base member 30. The insertion portions 36B are provided on the other one of the movable member 14 and the base member 30. In the present embodiment, the grooves 36A are provided on the movable member 14, and the insertion portions 36B are provided on the base member 30. The grooves 36A are provided, for example, between one of the first sides 24 and the surrounding wall 26 and between the other of the first sides 24 and the surrounding wall 26 in the second direction DY. The insertion portions 36B are respectively provided on the second sides 32. More specifically, the insertion portions 36B partially include the second sides 32. The insertion portions 36B are inserted into the grooves 36A so that the movable member 14 is movable relative to the base member 30. The insertion of the insertion portions 36B into the grooves 36A in the first direction DX obtains a state in which the base member 30 surrounds the surrounding wall 26 of the movable member 14.

The battery holder 10 further includes a coupling structure 38 that couples the movable member 14 and the base member 30 together so that the movable member 14 is movable relative to the base member 30. In the present embodiment, the first holding portion 12 further includes the coupling structure 38. The coupling structure 38 includes a pair of first coupling portions 38A and a pair of second coupling portions 38B. The first coupling portions 38A are provided on the movable member 14. The second coupling portions 38B are provided on the base member 30. The first coupling portions 38A and the second coupling portions 38B are coupled together to couple the movable member 14 and the base member 30.

The first coupling portions 38A are, for example, respectively provided on the f first sides 24. More specifically, two of the first coupling portions 38A are provided on each of the first sides 24 at portions facing the base member 30. The number of the first coupling portions 38A is four. At least one of the first coupling portions 38A and the second coupling portions 38B includes a snap-fit. Only the first coupling portions 38A, only the second coupling portions 38B, or both the first coupling portions 38A and the second coupling portions 38B include a snap-fit. In the present embodiment, the first coupling portions 38A include a snap-fit. The snap-fit includes a hook engaged with the second coupling portions 38B. The second coupling portions 38B are, for example, respectively provided on the second sides 32. More specifically, the second coupling portions 38B are each configured to be a portion of the rear surfaces 30B of the second sides 32 corresponding to the respective first coupling portions 38A. In a state in which the first coupling portions 38A are coupled to the second coupling portions 38B, the movable member 14 and the base member 30 are coupled to each other holding the first biasing members 28 in between. The coupling structure 38 can be provided at an inner side of the first sides 24 in the second direction DY, for example, the inner space 26A.

Movement of the movable member 14 toward one side in the first direction DX is restricted by contact of the first coupling portions 38A with the second coupling portions 38B. In a case in which the first coupling portions 38A are in contact with the second coupling portions 38B, the gap S is the largest. Movement of the movable member 14 toward the other side in the first direction DX is restricted by contact of the first facing surface 14B of the movable member 14 with the second facing surface 30A of the base member 30. In a case in which the first facing surface 14B is in contact with the second facing surface 30A, the gap S is the smallest. In one example, in a case in which the first facing surface 14B is in contact with the second facing surface 30A, there is substantially no gap S.

The first holding portion 12 further includes a cover 40 coupled to the surrounding wall 26 of the movable member 14 to close the inner space 26A of the surrounding wall 26. The cover 40 is coupled to the surrounding wall 26, for example, by four bolts BT2. The insertion portions 36B are inserted into the grooves 36A, the first coupling portions 38A are coupled to the second coupling portions 38B, and the cover 40 is coupled to the surrounding wall 26. This obtains the first holding portion 12.

Figure 6:
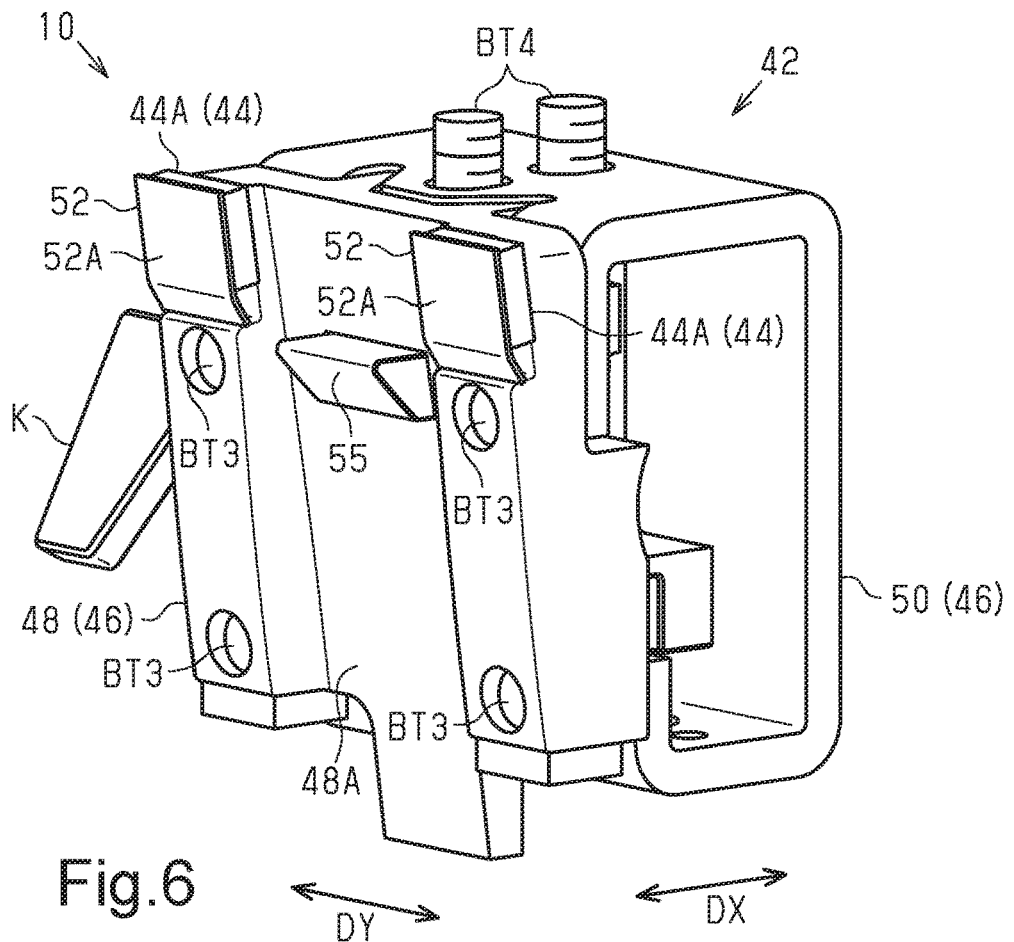
FIG. 6 is a perspective view of a second holding portion of the battery holder shown in FIG. 2.

As shown in FIG. 6, the second holding portion 42 includes a second biasing member 44 that biases the battery unit 60 towards the first holding portion 12. The second holding portion 42 further includes a support member 46 configured to be attached to the frame A1 of the human-powered vehicle A. The support member 46 includes a second support surface 48A that contacts the second end 66 of the battery unit 60. The support member 46 further includes a first support member 48 and a second support member 50. The first support member 48 includes a second support surface 48A. The first support member 48 is coupled to the second support member 50. The first support member 48 is coupled to the second support member 50, for example, by four bolts BT3 (refer to FIG. 7). The second support member 50 is coupled to the down tube DT, for example, by two bolts BT4.

Figure 7:
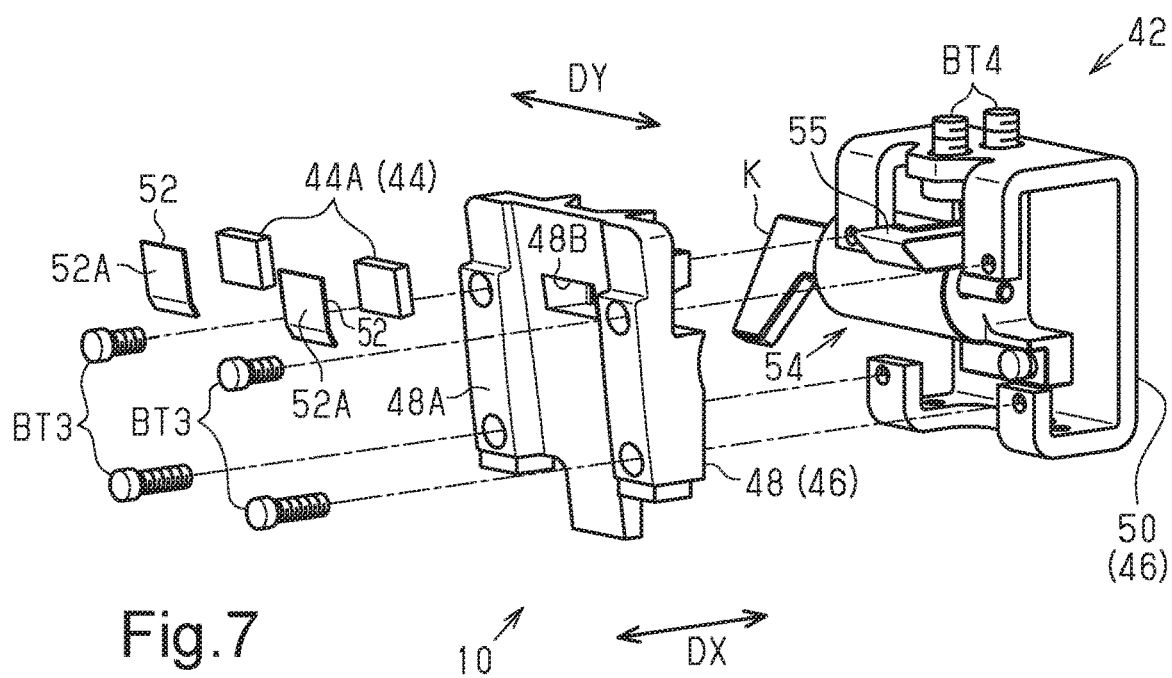
FIG. 7 is an exploded perspective view of the second holding portion shown in FIG. 6.

As shown in FIG. 7, the first support member 48 further includes a through hole 48B. The through hole 48B extends through the first support member 48 in the first direction DX. The through hole 48B extends through, for example, a central portion of the first support member 48 in the second direction DY. The second biasing member 44 is provided on the second support surface 48A of the support member 46. In the present embodiment, the number of the second biasing members 44 is two. The second biasing members 44 are, for example, provided on the second support surface 48A so that the through hole 48B is arranged between the second biasing members 44 in the second direction DY. Each second biasing member 44 includes a second elastic member 44A. The second elastic member 44A includes rubber. For example, the size of the second biasing member 44 is set in accordance with the range of manufacturing tolerance of the battery unit 60 in the first direction DX.

The second holding portion 42 further includes second contact members 52, each having a second contact surface 52A. The second contact members 52 are attached to the second biasing member 44 so that the second contact surfaces 52A are in contact with the second end 66 of the battery unit 60. The second contact members 52 are attached to, for example, two second biasing members 44, respectively. The second contact surfaces 52A of the second contact members 52 have a lower friction coefficient than the second biasing members 44. The material of the second contact surfaces 52A includes a metal or a resin. In one example, the second contact members 52 include stainless steel. The second holding portion 42 further includes a lock mechanism 54 for holding the battery unit 60 onto the battery holder 10.

Figure 8:
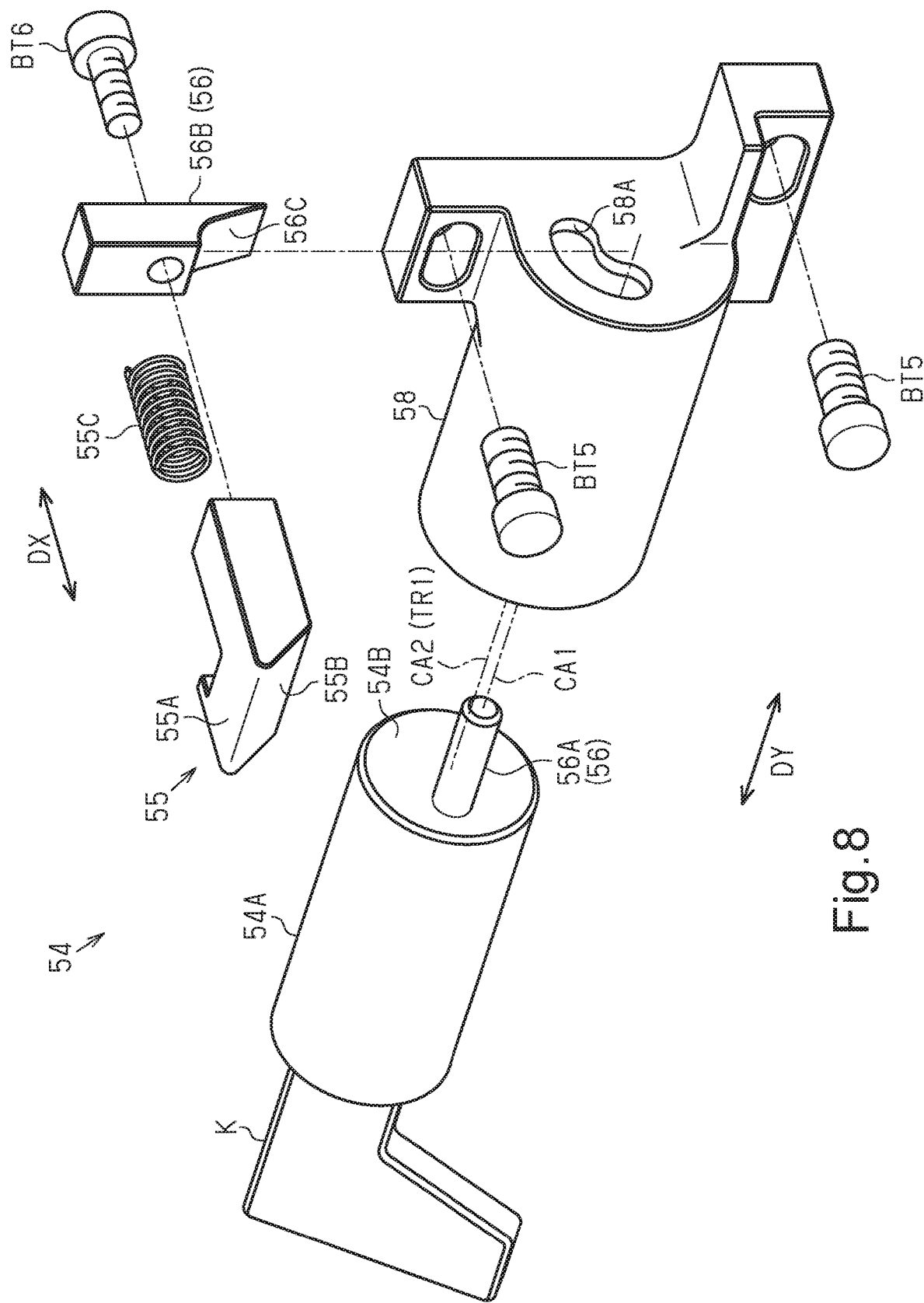
FIG. 8 is an exploded perspective view of a lock mechanism for the battery holder shown in FIG. 7.

As shown in FIG. 8, the lock mechanism 54 includes a contact portion 55, a cylinder 54A, a cam mechanism 56, and a housing 58. The contact portion 55 is movable relative to the support member 46 so as to contact the second end surface 66A of the battery unit 60. The cylinder 54A is configured to move the contact portion 55 in accordance with a predetermined operation. The cam mechanism 56 converts the predetermined operation into movement of the contact portion 55. The housing 58 covers the cylinder 54A. In the present embodiment, the contact portion 55 is a latch extending in the first direction DX. The contact portion 55 is provided to linearly move relative to the support member 46. In the present embodiment, the contact portion 55 is provided to linearly move relative to the support member 46 in the first direction DX. One example of the predetermined operation is an operation with a key unit K (hereafter, referred to as "key operation").

The cylinder 54A includes an insertion hole allowing for insertion of the key unit K. The insertion hole of the cylinder 54A, for example, faces the left side of the human-powered vehicle A and is exposed to the exterior via a through hole provided in the down tube DT. The cylinder 54A is supported by the housing 58 and rotatable about the support member 46 in accordance with the key operation. The housing 58 is provided on the second support member 50 (refer to FIG. 9). The housing 58 is coupled to the second support member 50, for example, by two bolts BT5.

The cam mechanism 56 includes a first cam 56A and a second cam 56B. The first cam 56A includes a rod member extending like a rod. More specifically, the first cam 56A is a cylindrical member extending in the second direction DY. The first cam 56A is provided on a distal surface 54B of the cylinder 54A. A center axis CA1 of the first cam 56A is offset from a center axis CA2 of the cylinder 54A. The center axis CA2 of the cylinder 54A coincides with a rotational axis TR1 of the key unit K. The rotational axis TR1 of the key unit K is, for example, perpendicular to the first direction DX. In the present embodiment, the rotational axis TR1 of the key unit K extends in the second direction DY. The first cam 56A is provided on the distal surface 54B of the cylinder 54A to eccentrically rotate with respect to the cylinder 54A. The first cam 56A is, for example, inserted into a groove 58A of the housing 58 and eccentrically rotates so that the first cam 56A moves between the opposite ends of the groove 58A in accordance with the key operation. The groove 58A is a through hole, the contour of which is arcuate about the rotation axis TR1.

The second cam 56B is provided on the contact portion 55 to engage with the first cam 56A. The second cam 56B includes a cam surface 56C engaged with the first cam 56A. The cam surface 56C converts rotational motion of the first cam 56A into linear motion. In the present embodiment, the cam surface 56C is curved in a view from a direction (second direction DY) perpendicular to the first direction DX. The second cam 56B is provided on the contact portion 55, for example, so that the cam surface 56C extends in a direction intersecting with the first direction DX. The second cam 56B can be integrated with the contact portion 55 or can be separate from the contact portion 55. In the present embodiment, the second cam 56B is separate from the contact portion 55 and is coupled to the contact portion 55 by a bolt BT6. In this case, the position of the second cam 56B with respect to the contact portion 55 is changeable. Thus, the lock mechanism 54 can be configured so that the insertion direction of the key unit K is changed in accordance with the specifications of the frame A1 of the human-powered vehicle A by changing the position of the first cam 56A, the position of the cylinder 54A, and the position of the housing 58 in the same manner as the second cam 56B. More specifically, the lock mechanism 54 can be configured so that the insertion hole of the cylinder 54A faces toward the upper side, the right side, or the lower side of the human-powered vehicle A. As described above, the configuration in which the insertion direction of the key unit K is changed by changing the position of the cylinder 54A, the position of the cam mechanism 56, and the position of the housing 58 can be applied to a lock mechanism including the contact portion 55 provided to linearly move.

Figure 9:
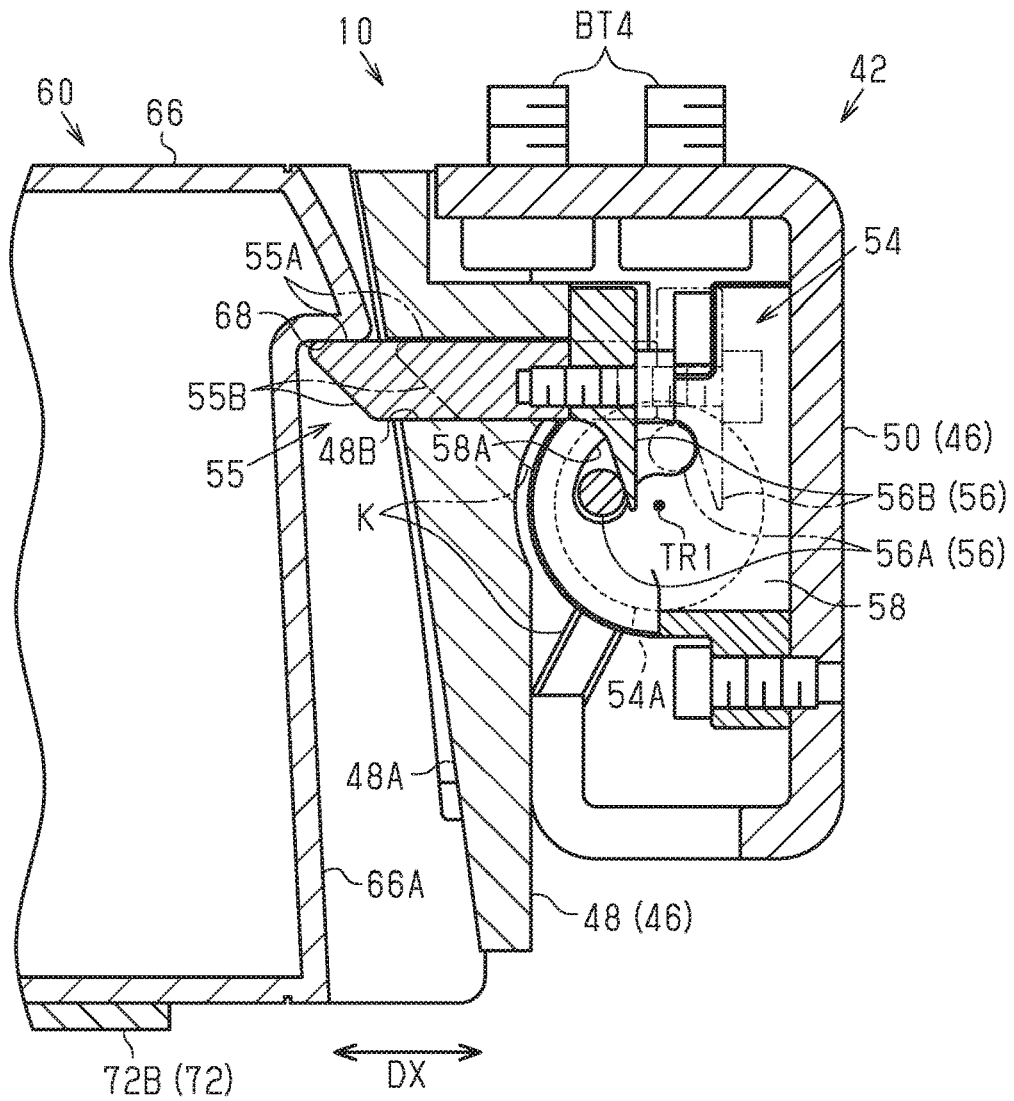
FIG. 9 is a cross-sectional view of the battery unit and the second holding portion shown in FIG. 2.

As shown in FIG. 9, the contact portion 55 includes a support surface 55A supporting a supported portion 68 provided on the second end surface 66A of the battery unit 60. In the present embodiment, the support surface 55A is the upper surface of the contact portion 55. The contact portion 55 is provided to linearly move in accordance with movement of the second cam 56B. The contact portion 55 is provided to linearly move in the first direction DX so that the contact portion 55 is inserted through the through hole 48B of the first support member 48. In other words, the contact portion 55 moves in a direction which is perpendicular to the rotational axis TR1 of the key unit K.

The contact portion 55 is provided to be movable between a first position where the supported portion 68 of the battery unit 60 is supported by the support surface 55A and a second position where the supported portion 68 is not supported. In a state in which the contact portion 55 is located at the first position, the contact portion 55 projects from the second support surface 48A of the first support member 48 through the through hole 48B toward the first holding portion 12. In a state in which the contact portion 55 is located at the second position, the contact portion 55 is separated farther from the first holding portion 12 than the first position. In a state in which the contact portion 55 is located at the second position, the contact portion 55 is located at an inner side of the second holding portion 42 with respect to the through hole 48B. The contact portion 55 is, for example, biased by a biasing member 55C (refer to FIG. 8) to the first position. In one example, the biasing member 55C is provided between the contact portion 55 and the housing 58 to bias the contact portion 55 from the second position toward the first position. The lock mechanism 54 shown by the solid lines in FIG. 9 shows a state in which the contact portion 55 is located at the first position. The lock mechanism 54 shown by the double-dashed lines in FIG. 9 shows a state in which the contact portion 55 is located at the second position.

The contact portion 55 and the second end surface 66A of the battery unit 60 are configured to limit interference with attachment of the battery unit 60 to the battery holder 10. The contact portion 55 further includes an inclined surface 55B inclined from the support surface 55A. The inclined surface 55B is configured so that by contacting the second end surface 66A of inclined surface, the contact portion 55 is moved toward the second position. More specifically, in a process of attaching the battery unit 60 to the battery holder 10, the second end surface 66A comes into contact with the inclined surface 55B so that the battery unit 60 pushes the contact portion 55. Accordingly, the contact portion 55 moves toward the second position. Then, in a state in which the second end surface 66A of the battery unit 60 is out of contact with the inclined surface 55B, the contact portion 55 is moved to the first position by force received from the biasing member 55C, and the supported portion 68 of the battery unit 60 is supported by the support surface 55A.

In a case in which the key unit K is rotated in one direction, as the cylinder 54A rotates, the first cam 56A eccentrically rotates along the groove 58A. The first cam 56A pushes the second cam 56B to move the contact portion 55 from the first position to the second position. In this case, the battery unit 60 can be removed from the battery holder 10. In a case in which the key unit K is released from the input, the contact portion 55 is moved from the second position to the first position by biasing force of the biasing member 55C. As the second cam 56B pushes the first cam 56A, the first cam 56A eccentrically rotates along the groove 58A, and the cylinder 54A rotates. This rotates the key unit K in the other direction. In this case, the support surface 55A of the contact portion 55 is in a state allowed to support the supported portion 68 of the battery unit 60, and the battery unit 60 is held by the battery holder 10.

Figure 10:
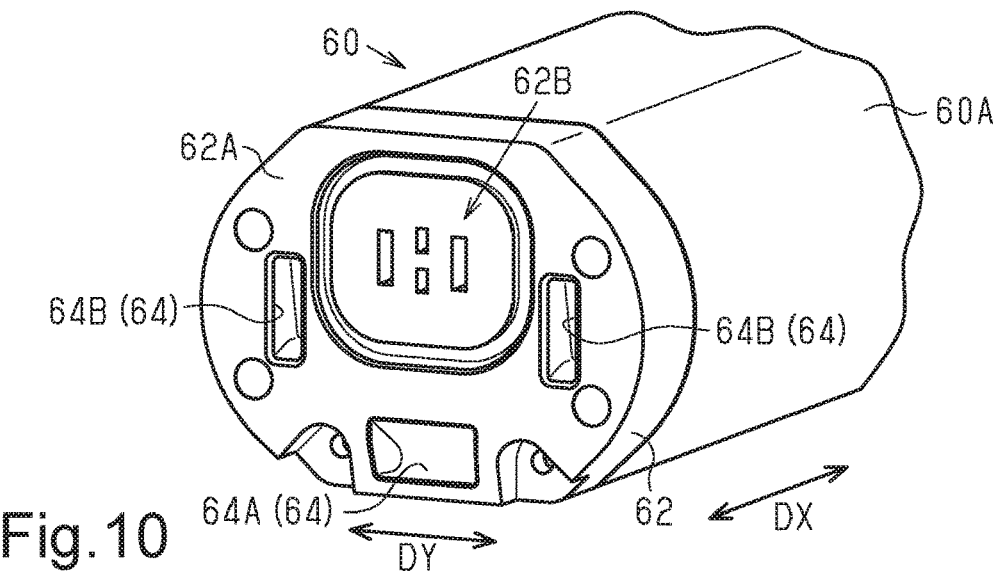
FIG. 10 is a perspective view showing a first end of the battery unit shown in FIG. 2.

As shown in FIG. 10, the battery unit 60 further includes an engaged portion 64 that is engaged with the engagement portion 18 of the movable member 14. The engaged portion 64 is provided on the first end surface 62A of the battery unit 60. The engaged portion 64 includes a first engaged portion 64A and a pair of second engaged portions 64B. Each of the first engaged portion 64A and the second engaged portions 64B is recessed. The first engaged portion 64A is configured to engage with the first engagement portion 20. The first engaged portion 64A includes a recess into which the first engagement portion 20 is inserted. The first engaged portion 64A is provided on the first end surface 62A of the battery unit 60 at a portion corresponding to the first engagement portion 20. The second engaged portions 64B are configured to engage with the respective second engagement portions 22. The second engaged portions 64B include recesses into which the respective second engagement portions 22 are inserted. The second engaged portions 64B are provided on the first end surface 62A of the battery unit 60 at portions corresponding to the second engagement portions 22. The first engaged portion 64A engages with the first engagement portion 20, and the second engaged portions 64B engage with the second engagement portions 22. As a result, the battery unit 60 is held by the first holding portion 12 in an installed state in which movement of the first end 62 of the battery unit 60 is restricted at least in the second direction DY. In the present embodiment, the first engaged portion 64A engages with the first engagement portion 20, and the second engaged portions 64B engage with the second engagement portions 22. As a result, the battery unit 60 is held by the first holding portion 12 in an installed state in which movement of the first end 62 is restricted in all directions perpendicular to the first direction DX.

Figure 11:
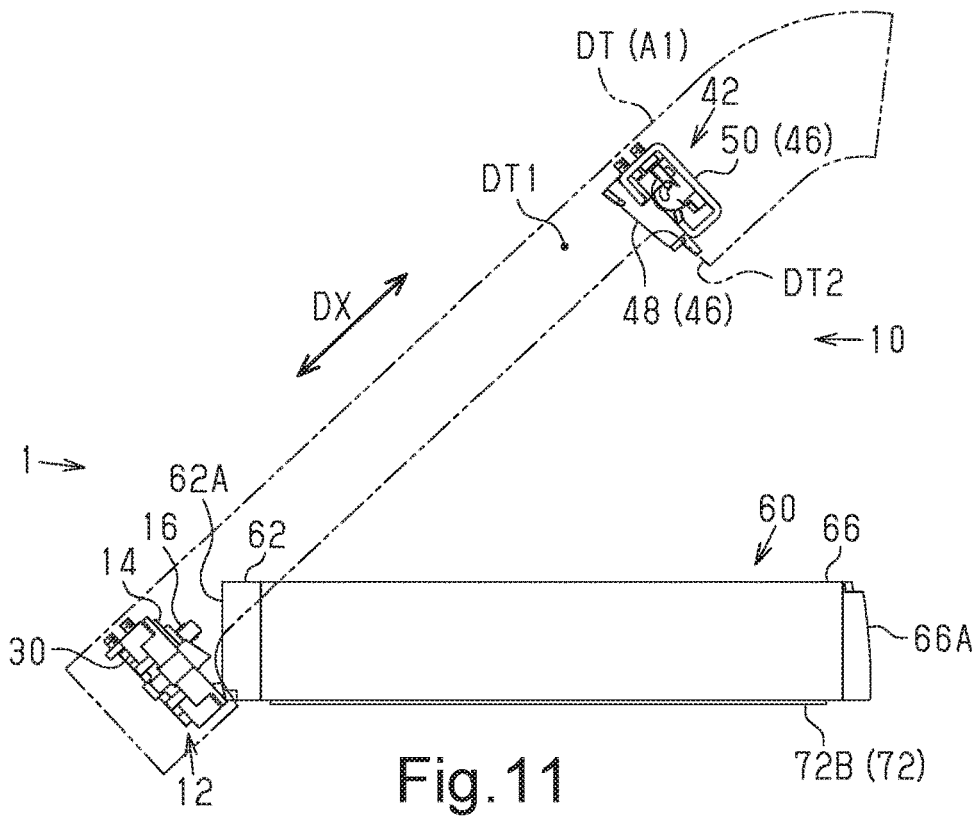
FIG. 11 is a side elevational view showing one example of a procedure for attaching the battery unit to the battery holder shown in FIG. 2.

The procedures for attaching the battery unit 60 to the battery holder 10 will now be described with reference to FIG. 11. The battery unit 60 is attached to the battery holder 10, for example, through the following procedures. In the first step, the first engaged portion 64A of the battery unit 60 is hooked on the first engagement portion 20 of the first holding portion 12. In the second step, the battery unit 60 is pivoted about the first engagement portion 20, used as the pivot point, so that the battery unit 60 is accommodated in the accommodation space DT1 of the down tube DT. As a result, the second engaged portions 64B of the battery unit 60 engage with the second engagement portions 22 of the first holding portion 12, and the terminal 62B of the battery unit 60 is connected to the connector 16 of the first holding portion 12. The battery unit 60 is further pivoted about the first engagement portion 20, used as the pivot point. As a result, the supported portion 68 of the battery unit 60 is supported by the contact portion 55, and the battery unit 60 is held by the battery holder 10 in a state in which the battery unit 60 is accommodated in the accommodation space DT1 of the down tube DT. In the fourth step, the cover 70 is attached to the battery unit 60. The fourth step can be performed before the first step. Through the procedures, the battery unit 60 is attached to the battery holder 10.

The first biasing member 28 and the second biasing member 44 are compressed in accordance with manufacturing tolerance of the battery unit 60. This limits formation of gaps between the first end surface 62A of the battery unit 60 and the first support surface 14A of the first holding portion 12 and between the second end surface 66A of the battery unit 60 and the second support surface 48A of the second holding portion 42. Thus, the battery unit 60 is appropriately held. By inserting the key unit K into the cylinder 54A and rotating the key unit K in one direction, the battery unit 60 is released from the holding of the battery holder 10, and the battery unit 60 can be removed from the battery holder 10.

Second Embodiment

A second embodiment of a battery holder 80 will now be described with reference to FIGS. 12 to 14. The same reference characters are given to those components that are the same as the corresponding components of the first embodiment. Such components will not be described in detail.

Figure 12:
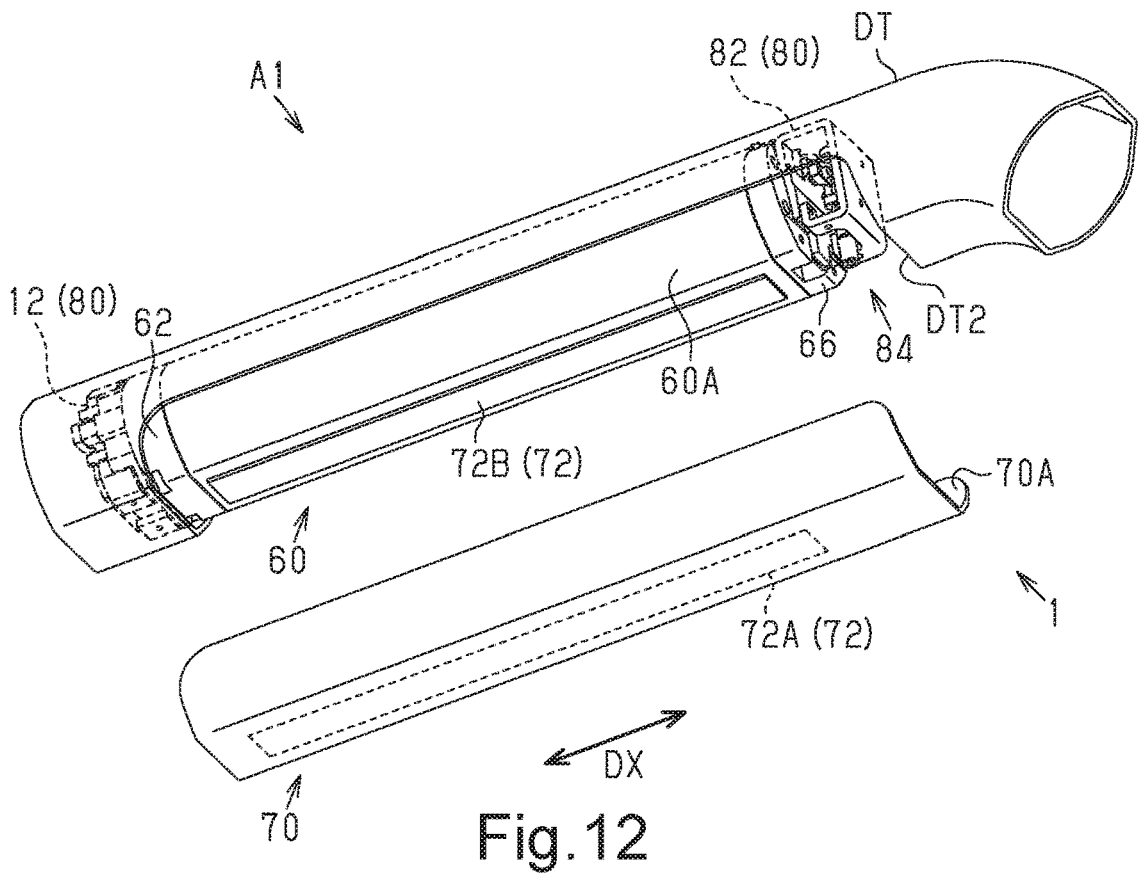
FIG. 12 is an exploded perspective view of a battery component including a battery holder in accordance with a second embodiment with a cover removed.

As shown in FIG. 12, the battery holder 80 includes the first holding portion 12, which supports the first end 62 of the battery unit 60, and a second holding portion 82 supporting the second end 66 of the battery unit 60. The second holding portion 82 and the second holding portion 42 of the first embodiment have the same structure except for the lock mechanism 54. The second holding portion 82 further includes a lock mechanism 84 configured so that the battery unit 60 is held by the battery holder 80. The second holding portion 82 is coupled to the down tube DT so that a portion of the lock mechanism 84 is exposed from the opening DT2 in a state in which the cover 70 is removed from the battery unit 60. In the present embodiment, the opening DT2 in the first direction DX is greater in size than the opening DT2 of the first embodiment in the first direction DX. The first holding portion 12 can be coupled to the down tube DT so that at least a portion of the first holding portion 12 is exposed from the opening DT2 or so that the first holding portion 12 is not exposed from the opening DT2 in a state in which the cover 70 is removed from the battery unit 60.

Figure 13:
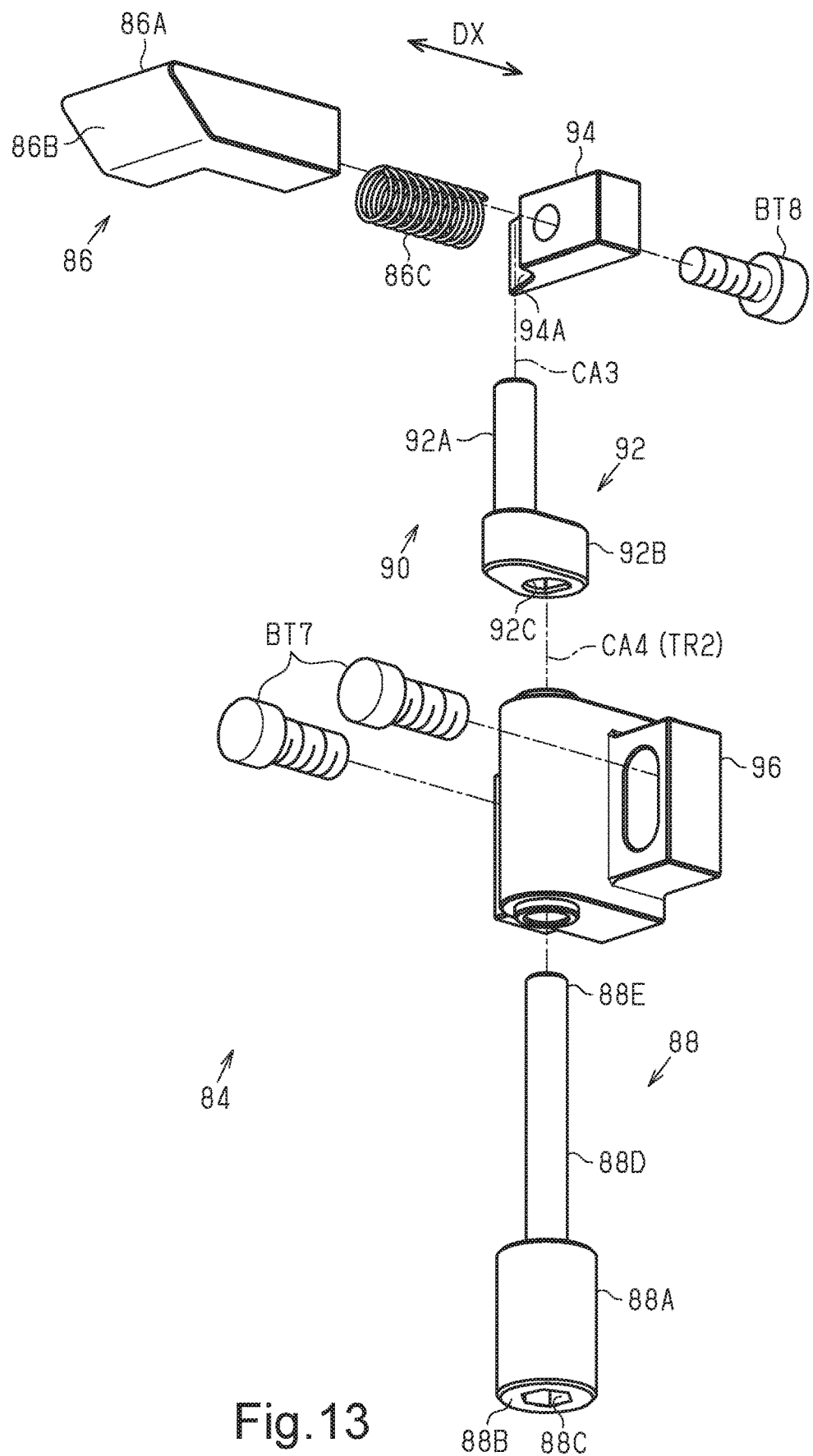
FIG. 13 is an exploded perspective view of a lock mechanism for the battery holder shown in FIG. 12.

As shown in FIG. 13, the lock mechanism 84 includes a contact portion 86, a cylinder 88, a cam mechanism 90, and a housing 96. The contact portion 86 is movable relative to the support member 46 so as to contact the second end surface 66A of the battery unit 60. The cylinder 88 is configured to move the contact portion 86 in accordance with a predetermined operation. The cam mechanism 90 converts the predetermined operation into movement of the contact portion 86. The housing 96 covers a portion of the cylinder 88. In the present embodiment, the contact portion 86 is a latch extending in the first direction DX. The contact portion 86 is provided to linearly move relative to the support member 46. In the present embodiment, the contact portion 86 is provided to linearly move relative to the support member 46 in the first direction DX. One example of the predetermined operation is an operation performed with a predetermined tool (hereafter, referred to as the "tool operation"). In the present embodiment, the predetermined tool is a hex key. The predetermined tool can be a driver or the like.

The cylinder 88 includes a first part 88A and a second part 88D having diameters differing from each other. The first part 88A is, for example, integrated with the second part 88D. The first part 88A includes a tool engagement portion 88C allowing for engagement with the predetermined tool. In the present embodiment, the tool engagement portion 88C is a hexagonal hole engageable with a hex key. The predetermined tool is inserted into the tool engagement portion 88C so that the predetermined tool engages with the tool engagement portion 88C. The tool operation rotates the cylinder 88 relative to the support member 46. As described above, since the cylinder 88 can be rotated by the tool operation, the cylinder 88 does not need to include an insertion hole allowing for insertion of the key unit K. Thus, the cylinder 88 does not have to be enlarged, contributing to space-saving.

The tool engagement portion 88C is provided, for example, to face to a lower side of the human-powered vehicle A. In the present embodiment, the tool engagement portion 88C is provided on an end surface 88B of the first part 88A. In a state in which the cover 70 is removed from the battery unit 60, the tool engagement portion 88C is exposed from the opening DT2 (refer to FIG. 12). The opening DT2, which is for insertion of the battery unit 60 into the down tube DT, is used to engage the predetermined tool with the tool engagement portion 88C. Thus, the down tube DT does not need to include a through hole for exposing the tool engagement portion 88C other than the opening DT2. This configuration limits lowering of the strength of the down tube DT. The cover 70 is attached to the battery unit 60 to close the tool engagement portion 88C together with the opening DT2.

The second part 88D has a smaller diameter than the first part 88A. The second part 88D includes a fitting portion 88E that is configured to fit to the cam mechanism 90. The fitting portion 88E is provided on a distal end of the second part 88D. The fitting portion 88E is a portion that has undergone predetermined machining. One example of the predetermined machining is D-shaped cutting. The second part 88D is supported by the housing 96 and rotatable relative to the support member 46 through the tool operation. In a state in which the second part 88D is supported by the housing 96, the fitting portion 88E is fitted to the cam mechanism 90 at a position projected from the housing 96. The housing 96 is provided on the second support member 50. The housing 96 is coupled to the second support member 50, for example, by two bolts BT7.

The cam mechanism 90 includes a first cam 92 and a second cam 94. The first cam 92 includes a rod member 92A extending like a rod and a support member 92B supporting the rod member 92A. The rod member 92A is a cylindrical member provided to extend in a direction perpendicular to the first direction DX. In the present embodiment, the rod member 92A is arranged to extend in a direction perpendicular to the first direction DX and the second direction DY. A center axis CA3 of the rod member 92A is offset from a center axis CA4 of the cylinder 88. The center axis CA4 of the cylinder 88 coincides with the center axes of the first part 88A and the second part 88D. The center axis CA4 of the cylinder 88 coincides with a rotational axis TR2 of the predetermined tool. The rotational axis TR2 of the predetermined tool is, for example, perpendicular to the first direction DX. The rod member 92A is provided on the support member 92B to eccentrically rotate with respect to the cylinder 88. The support member 92B includes a fitted portion 92C configured to be fitted to the fitting portion 88E of the cylinder 88. In a state in which the fitting portion 88E of the cylinder 88 is fitted to the fitted portion 92C, the first cam 92 rotates integrally with the cylinder 88. For example, the housing 96 can include a configuration restricting the range of rotation of the first cam 92.

The second cam 94 is provided on the contact portion 86 to engage with the first cam 92. The second cam 94 includes a cam surface 94A engaged with the first cam 92. The cam surface 94A converts rotational motion of the first cam 92 into linear motion. In the present embodiment, the cam surface 94A is curved in a view from a direction (second direction DY) perpendicular to the first direction DX. The second cam 94 is provided on the contact portion 86, for example, so that the cam surface 94A extends in a direction intersecting with the first direction DX. The second cam 94 can be integrated with the contact portion 86 or can be separate from the contact portion 86. In the present embodiment, the second cam 94 is separate from the contact portion 86 and coupled to the contact portion 86 by a bolt BT8. In this case, the position of the second cam 94 with respect to the contact portion 86 is changeable. Thus, the lock mechanism 84 is configured so that the insertion direction of the predetermined tool is varied in accordance with the specifications of the frame A1 of the human-powered vehicle A by changing the position of the first cam 92, the position of the cylinder 88, and the position of the housing 96 in the same manner as the second cam 94. More specifically, the lock mechanism 84 can be configured so that the tool engagement portion 88C of the cylinder 88 faces toward the upper side, the right side, or the left side of the human-powered vehicle A. As described above, the configuration in which the insertion direction of the predetermined tool is changed by changing the position of the cylinder 88, the position of the cam mechanism 90, and the position of the housing 96 can be applied to a lock mechanism including the contact portion 86 provided to linearly move.

Figure 14:
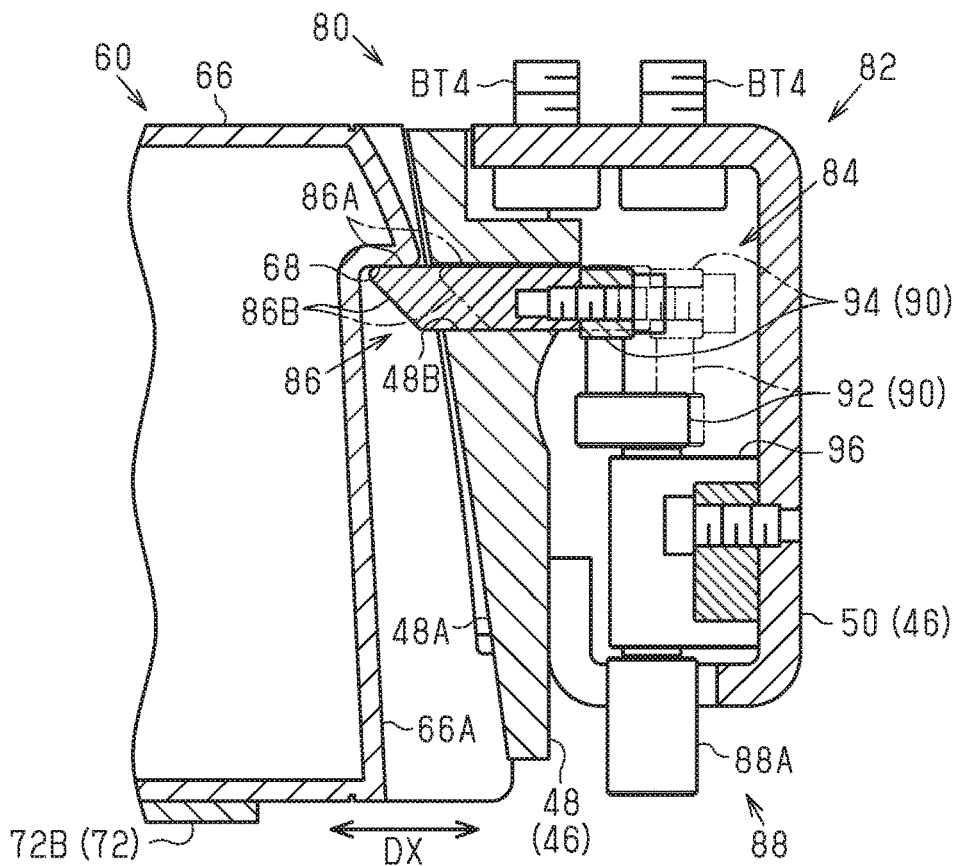
FIG. 14 is a cross-sectional view of the battery unit and the second holding portion shown in FIG. 12.

As shown in FIG. 14, the contact portion 86 includes a support surface 86A supporting the supported portion 68 of the battery unit 60. In the present embodiment, the support surface 86A is the upper surface of the contact portion 86. The contact portion 86 is provided to linearly move in accordance with movement of the second cam 94. More specifically, the contact portion 86 is provided to be movable in the first direction DX so that the contact portion 86 is inserted through the through hole 48B in the first support member 48. The direction in which the contact portion 86 moves is perpendicular to the rotational axis TR2 of the predetermined tool.

The contact portion 86 is provided to be movable between a first position where the supported portion 68 of the battery unit 60 is supported by the support surface 86A and a second position where the supported portion 68 is not supported. In a state in which the contact portion 86 is located at the first position, the contact portion 86 projects from the second support surface 48A of the first support member 48 through the through hole 48B toward the first holding portion 12. In a state in which the contact portion 86 is located at the second position, the contact portion 86 is separated farther from the first holding portion 12 than the first position. In a state in which the contact portion 86 is located at the second position, the contact portion 86 is located at an inner side of the second holding portion 42 with respect to the through hole 48B. The contact portion 86 is, for example, biased by a biasing member 86C (refer to FIG. 13) to the first position. In one example, the biasing member 86C is provided between the contact portion 86 and the housing 96 to bias the contact portion 86 from the second position toward the first position. The lock mechanism 84 shown by the solid lines in FIG. 14 shows a state in which the contact portion 86 is located at the first position. The lock mechanism 84 shown by the double-dashed lines in FIG. 14 shows a state in which the contact portion 86 is located at the second position.

The contact portion 86 and the second end surface 66A of the battery unit 60 are configured to limit interference with attachment of the battery unit 60 to the battery holder 80. The contact portion 86 further includes an inclined surface 86B inclined from the support surface 86A. The inclined surface 86B is configured to contact the second end surface 66A of the battery unit 60 so that the contact portion 86 moves toward the second position. More specifically, in a process of attaching the battery unit 60 to the battery holder 80, the second end surface 66A comes into contact with the inclined surface 86B so that the battery unit 60 pushes the contact portion 86. Accordingly, the contact portion 86 moves toward the second position. Then, in a state in which the second end surface 66A of the battery unit 60 is out of contact with the inclined surface 86B, the contact portion 86 is moved to the first position by force received from the biasing member 86C, and the supported portion 68 of the battery unit 60 is supported by the support surface 86A.

The contact portion 86 and the second cam 94 of the second embodiment and the contact portion 55 and the second cam 56B of the first embodiment have the same configuration. The lock mechanism 54 of the first embodiment and the lock mechanism 84 of the second embodiment can use the common contact portions 55 and 86 and common the second cams 56B and 94. In the present embodiment, the second cam 94 is coupled to the contact portion 86 in a state rotated by 90° about the rotational axis extending in the first direction DX from the state of the first embodiment in which the second cam 56B is coupled to the contact portion 55 (refer to FIG. 13).

In a case in which the predetermined tool is rotated in one direction, as the cylinder 88 rotates, the first cam 92 eccentrically rotates with respect to the cylinder 88. The first cam 92 pushes the second cam 94 to move the contact portion 86 from the first position to the second position. In this case, the battery holder 80 can be removed from the battery unit 60. In a case in which the input to the predetermined tool is released, the contact portion 86 is moved from the second position to the first position by biasing force of the biasing member 86C. As the second cam 94 pushes the first cam 92, the first cam 92 eccentrically rotates with respect to the cylinder 88, and the cylinder 88 rotates. This rotates the predetermined tool in the other direction. In this case, the support surface 86A of the contact portion 86 is in a state allowed to support the supported portion 68 of the battery unit 60, and the battery unit 60 is held by the battery holder 80.

Third Embodiment

A third embodiment of a battery holder 100 will now be described with reference to FIGS. 15 to 17. The same reference characters are given to those components that are the same as the corresponding components of the first embodiment. Such components will not be described in detail.

Figure 15:
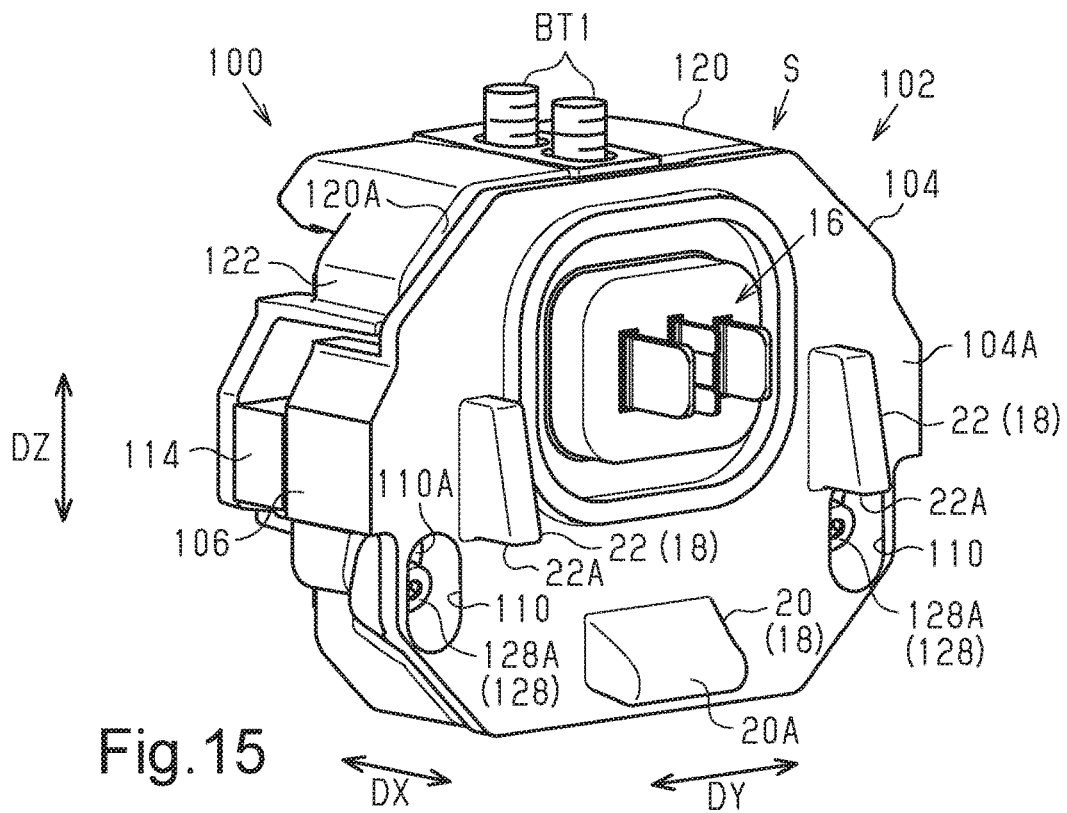
FIG. 15 is a perspective view showing a first holding portion of a battery holder in accordance with a third embodiment.

As shown in FIG. 15, the battery holder 100 includes a first holding portion 102 that supports the first end 62 of the battery unit 60. The first holding portion 102 can be provided, for example, on the down tube DT of the human-powered vehicle A at a front side of the human-powered vehicle A or a rear side of the human-powered vehicle A. The battery holder 100 further can include one of the second holding portions 42 and 82 of the first embodiment and the second embodiment that support the second end 66 of the battery unit 60.

The first holding portion 102 has a first support surface 104A that contacts the first end 62 of the battery unit 60 and includes a movable member 104 movable relative to the frame A1 of the human-powered vehicle A and a first biasing member 114 that biases the movable member 104 toward the battery unit 60. The movable member 104 is movable relative to the frame A1 of the human-powered vehicle A in the first direction DX. The movable member 104 further includes the connector 16 connected to the terminal 62B of the battery unit 60. The connector 16 is provided to project from the first support surface 104A of the movable member 104. In a state in which the battery holder 100 holds the battery unit 60 so that the terminal 62B of the battery unit 60 is connected to the terminal of the connector 16, the battery unit 60 is electrically connected to various electrical elements mounted on the human-powered vehicle A.

The movable member 104 further includes the engagement portion 18 engaged with the first end 62 of the battery unit 60. The engagement portion 18 is provided to project from the first support surface 104A of the movable member 104. The engagement portion 18 includes the first engagement portion 20 and the second engagement portions 22. The first engagement portion 20 and the second engagement portions 22 are provided on the first support surface 104A in the same manner as the first embodiment.

The first holding portion 102 further includes a base member 120 configured to be attached to the frame A1 of the human-powered vehicle A. The base member 120 is attached to the down tube DT, for example, by the two bolts BT1. The first biasing member 114 is provided between the base member 120 and the movable member 104. More specifically, the first biasing member 114 is provided between the base member 120 and the movable member 104 in the first direction DX. The first biasing member 114 biases the movable member 104 so that the movable member 104 is movable relative to the base member 120 in the first direction DX. In the present embodiment, the number of first biasing members 114 is two (refer to FIG. 16). For example, the material of the first biasing members 114 and the size of the first biasing members 114 are substantially the same as those of the first biasing members 28 of the first embodiment.

The movable member 104 further includes a first facing surface 104B (refer to FIG. 16) facing the base member 120. The first facing surface 104B is opposite to the first support surface 104A in the first direction DX. The base member 120 includes a second facing surface 120A facing the movable member 104. In a state in which the battery unit 60 is not held by the first holding portion 102, the first facing surface 104B and the second facing surface 120A spaced apart by the gap S.

In a state in which the battery unit 60 is not held by the first holding portion 102, the first biasing members 114 extend the most, and the gap S is the largest. In a state in which the battery unit 60 is held by the first holding portion 102, the movable member 104 is moved relative to the base member 120 in a direction reducing the gap S in accordance with the manufacturing tolerance of the battery unit 60 in the first direction DX, and the first biasing members 114 are compressed by force received from the movable member 104. The compression of the first biasing members 114 allows the movable member 104 to move relative to the base member 120 maximally in the range of the gap S.

Figure 16:
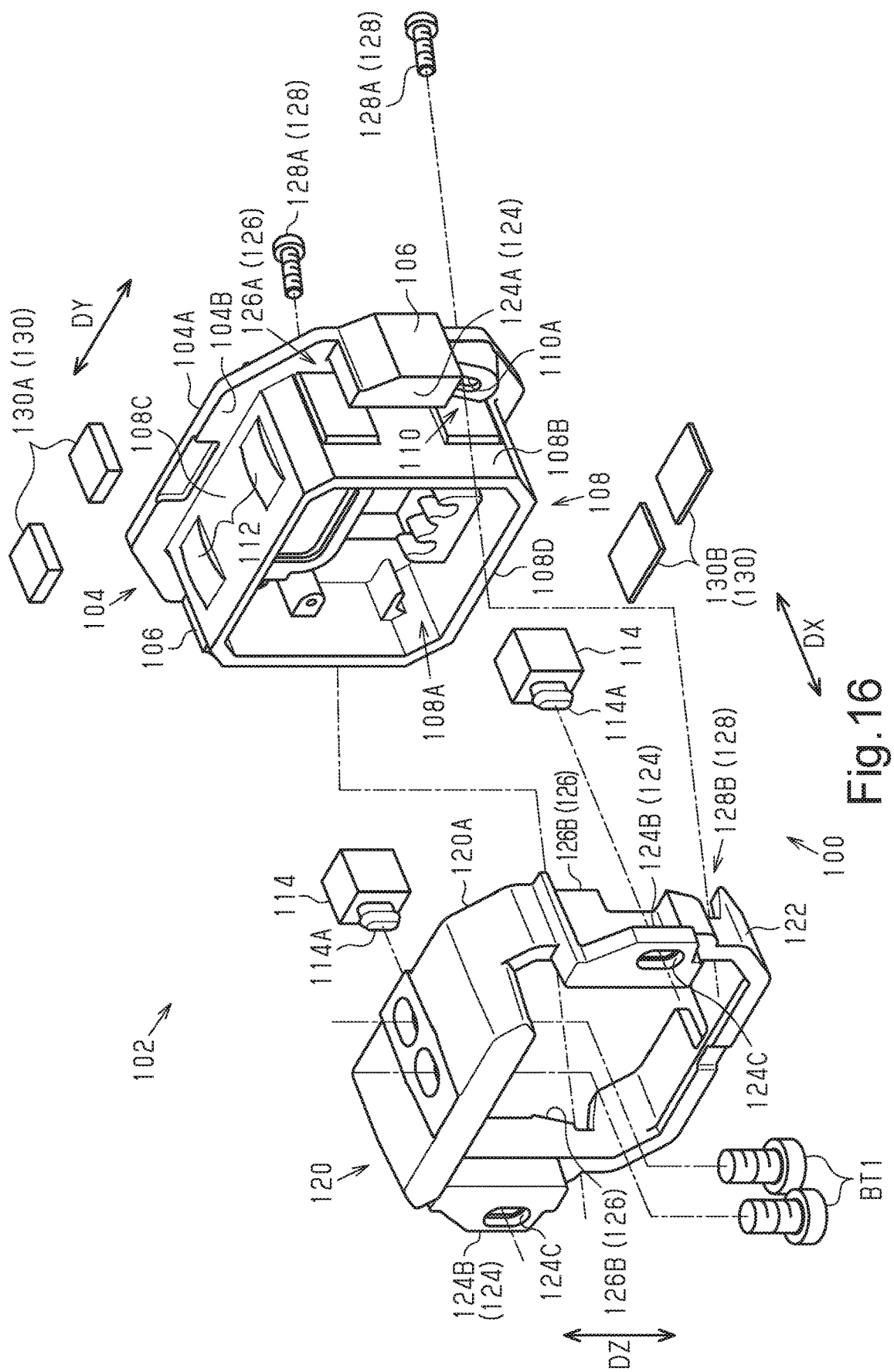
FIG. 16 is an exploded perspective view of the first holding portion shown in FIG. 15.

As shown in FIG. 16, the movable member 104 further includes a pair of first sides 106 facing each other in the second direction DY, which is perpendicular to the first direction DX extending in the longitudinal direction of the battery unit 60. The first sides 106 are provided to project from edges of the first facing surface 104B toward the base member 120. The first sides 106 are provided at opposite ends of the movable member 104 in the second direction DY. The first sides 106 partially include respective opposite side walls of the movable member 104 in the second direction DY. The movable member 104 further includes a surrounding wall 108 provided on the first facing surface 104B to define an inner space 108A configured to accommodate, for example, an electrical wire and an electrical substrate connected to the terminal of the connector 16. The surrounding wall 108 is provided at an inner side of the first sides 106 in the second direction DY. The first holding portion 102 further includes a cover that closes the inner space 108A of the surrounding wall 108. The cover is substantially the same as the cover 40 of the first embodiment. The base member 120 is configured to surround the surrounding wall 108 of the movable member 104. A portion of the base member 120 is arranged between the first sides 106 and the surrounding wall 108. The base member 120 further includes a pair of second sides 122 facing each other in the second direction DY.

The first holding portion 102 further includes a support structure 124 that supports the first biasing members 114 between the base member 120 and the movable member 104. The support structure 124 includes a pair of first supports 124A provided on the movable member 104 and a pair of second supports 124B provided on the base member 120. The first supports 124A are respectively provided on the first sides 106. More specifically, the first supports 124A are provided on the first sides 106 at portions facing the base member 120. The second supports 124B are respectively provided on the second sides 122. More specifically, the second supports 124B are provided to project outward from the second sides 122 in the second direction DY.

Each of the second supports 124B includes an attachment hole 124C, into which the first biasing member 114 is attached. Each of the first biasing members 114 includes an attachment portion 114A corresponding to the attachment hole 124C of the second support 124B. Insertion of the attachment portions 114A into the attachment holes 124C attaches the first biasing members 114 to the second supports 124B so that the first biasing members 114 are arranged between the base member 120 and the movable member 104. The first biasing members 114 can be attached to the second supports 124B by an adhesive. In this case, the attachment holes 124C and the attachment portions 114A can be omitted.

The first holding portion 102 further includes a guide structure 126 that guides movement of the movable member 104. The guide structure 126 includes grooves 126A provided on one of the movable member 104 and the base member 120 and insertion portions 126B provided on the other one of the movable member 104 and the base member 120. In the present embodiment, the grooves 126A are provided on the movable member 104, and the insertion portions 126B are provided on the base member 120. The grooves 126A are provided, for example, between one of the first sides 106 and the surrounding wall 108 and between the other first side 106 and the surrounding wall 108 in the second direction DY. The insertion portions 126B are respectively provided on the second sides 122. More specifically, the insertion portions 126B partially include the second sides 122. The insertion portions 126B are inserted into the grooves 126A so that the movable member 104 is movable relative to the base member 120. The insertion of the insertion portions 126B into the grooves 126A in the first direction DX obtains a state in which the base member 120 surrounds the surrounding wall 108 of the movable member 104.

The battery holder 100 further includes a coupling structure 128 that couples the movable member 104 and the base member 120 so that the movable member 104 is movable relative to the base member 120. The coupling structure 128 includes first coupling portions 128A and second coupling portions 128B. The first coupling portions 128A are configured to be coupled to the second coupling portions 128B. For example, the first coupling portions 128A are bolts. In the present embodiment, the number of the first coupling portions 128A is two. The second coupling portions 128B are provided, for example, on the base member 120. More specifically, the second coupling portions 128B are provided on the second sides 122 of the base member 120. For example, the second coupling portions 128B are threaded holes corresponding to the first coupling portions 128A. In the present embodiment, the number of the second coupling portions 128B is two. The first coupling portions 128A are, for example, inserted into the second coupling portions 128B through insertion holes 110 provided on the movable member 104. The first coupling portions 128A and the second coupling portions 128B are coupled together to couple the movable member 104 and the base member 120.

Movement of the movable member 104 toward one side in the first direction DX is restricted by contact of the first coupling portions 128A with the insertion holes 110. More specifically, movement of the movable member 104 toward one side in the first direction DX is restricted by contact of the bolt heads of the first coupling portions 128A with edges 110A of the movable member 104 defining the insertion holes 110. In a case in which the first coupling portions 128A are in contact with the insertion holes 110, the gap S is the largest. Movement of the movable member 104 toward the other side in the first direction DX is restricted by contact of the first facing surface 104B of the movable member 104 with the second facing surface 120A of the base member 120. In a case in which the first facing surface 104B is in contact with the second facing surface 120A, the gap S is the smallest.

The first holding portion 102 further includes a movement restriction member 130 provided between the movable member 104 and the base member 120 in a third direction DZ that is perpendicular to the first direction DX extending in the longitudinal direction of the battery unit 60 to restrict movement of the movable member 104 in the third direction DZ. In the present embodiment, the third direction DZ is perpendicular to the first direction DX and the second direction DY. Preferably, the movement restriction member 130 is elastic. Preferably, the movement restriction member 130 includes rubber.

The movement restriction member 130 includes a first movement restriction member 130A and a second movement restriction member 130B. The first movement restriction member 130A is provided, for example, between an end surface 108C of the movable member 104 and the base member 120 in the third direction DZ. In the present embodiment, the number of the first movement restriction members 130A is two. The second movement restriction member 130B is provided, for example, between the other end surface 108D of the movable member 104 and the base member 120 in the third direction DZ. In the present embodiment, the number of the second movement restriction members 130B is two. The first movement restriction members 130A are, for example, thicker than the second movement restriction members 130B in the third direction DZ.

The movable member 104 further includes a first contact surface 112 that contacts the movement restriction member 130. The first contact surface 112 is provided, for example, on the surrounding wall 108 of the movable member 104. More specifically, the first contact surface 112 is provided on an outer surface 108B of the surrounding wall 108. The number of the first contact surfaces 112 corresponds to the number of the movement restriction members 130. In the present embodiment, the number of the first contact surfaces 112 is four. In one example, two of the first contact surfaces 112 are provided on each of the end surfaces 108C and 108D in the third direction DZ in the outer surface 108B of the surrounding wall 108. The first contact surfaces 112 provided on the end surface 108C of the surrounding wall 108 are in contact with the first movement restriction members 130A. The first contact surfaces 112 provided on the end surface 108D of the surrounding wall 108 are in contact with the second movement restriction members 130B.

Figure 17:
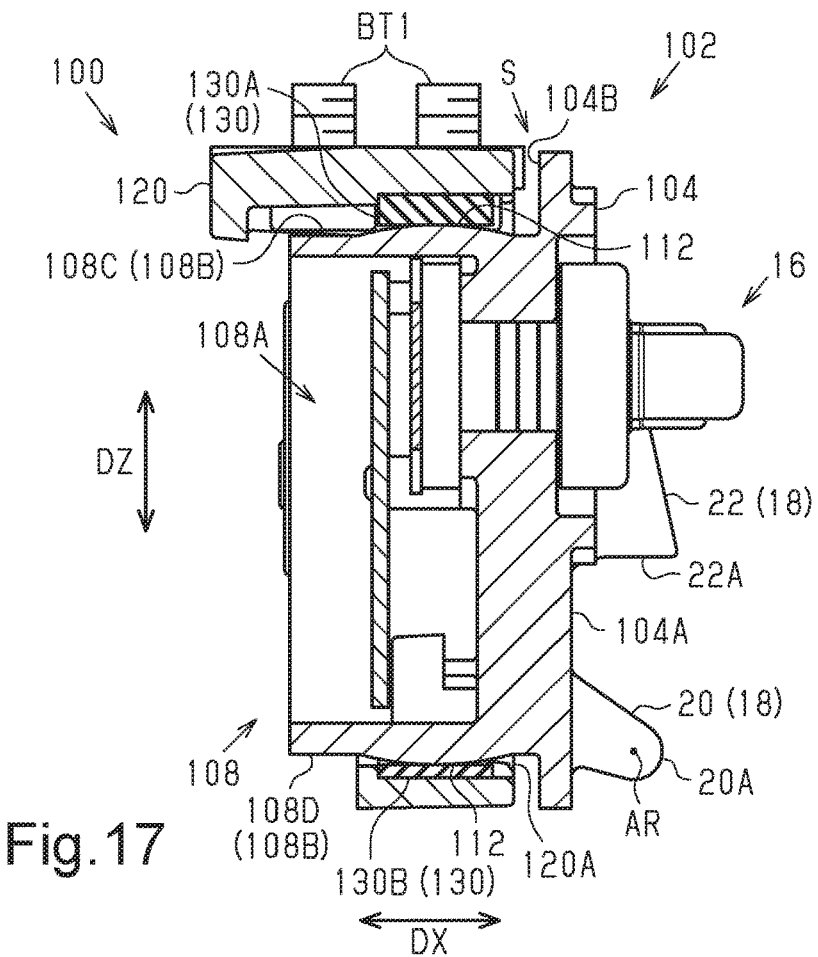
FIG. 17 is a cross-sectional side view of the first holding portion of FIG. 15.

FIG. 17 is a cross-sectional view of the first holding portion 102 taken in a direction extending through the first contact surfaces 112 in the first direction DX. The movement restriction members 130 are provided on the base member 120 to slide along the first contact surfaces 112 in accordance with movement of the movable member 104 in the first direction DX. The movement restriction members 130 are fixed to the base member 120, for example, by an adhesive or the like. Preferably, each of the first contact surfaces 112 is shaped as an arc that projects from the movable member 104 toward the base member 120 as viewed in a direction perpendicular to the first direction DX and the third direction DZ. In the present embodiment, the first contact surface 112 is shaped as an arc that projects from the movable member 104 toward the base member 120 as viewed in the second direction DY. In one example, the arc centers of the first contact surfaces 112 provided on the end surface 108C of the surrounding wall 108 conform to the arc centers of the first contact surfaces 112 provided on the end surface 108D of the surrounding wall 108. Since each of the first contact surfaces 112 is shaped as an arc that projects from the movable member 104 toward the base member 120 as viewed in the second direction DY, the movable member 104 is easy to pivot about an axis parallel to the second direction DY. Even when the positions of the second holding portions 42 and 82 attached to the first holding portion 102 are slightly deviated from the ideal positions in the third direction DZ, the movable member 104 pivots about the axis parallel to the second direction DY. Thus, the battery unit 60 is stably held.

Modifications

The description related to the embodiments exemplifies, without any intention to limit, applicable forms of a battery holder according to the present disclosure. The battery holder according to the present disclosure can be applicable to, for example, modifications of the embodiments that are described below and combinations of at least two of the modifications that do not contradict each other. In the following modifications, the same reference characters are given to those components that are the same as the corresponding components of the embodiments. Such components will not be described in detail.

The direction specified by the third direction DZ can be changed in any manner. In one example, the third direction DZ can be the same as the second direction DY. The first movement restriction members 130A are provided between one side surface of the movable member 104 in the third direction DZ and the base member 120. The second movement restriction members 130B are provided between the other side surface of the movable member 104 in the third direction DZ and the base member 120. In this case, preferably, the thickness of the first movement restriction members 130A is substantially the same as the thickness of the second movement restriction members 130B in the third direction. One or more of the first contact surfaces 112 are provided on one side surface and the other side surface in the outer surface 108B of the surrounding wall 108. The first contact surfaces 112 provided on the one side surface of the surrounding wall 108 are in contact with the first movement restriction members 130A. The first contact surfaces 112 provided on the other side surface of the surrounding wall 108 are in contact with the second movement restriction members 130B.

The configuration of the first contact surfaces 112 can be changed in any manner. The two of the first contact surfaces 112 provided on the end surface 108C of the surrounding wall 108 can be formed integrally. The two of the first contact surfaces 112 provided on the end surface 108D of the surrounding wall 108 can be formed integrally. The first contact surfaces 112 can extend straight in a direction perpendicular to the first direction DX and the third direction DZ. Three or more of the first contact surfaces 112 can be provided on the end surface 108C of the surrounding wall 108. Three or more of the first contact surfaces 112 can be provided on the end surface 108D of the surrounding wall 108.

The movement restriction members 130 can be fixed to the first contact surface 112, for example, by an adhesive or the like, and the movement restriction members 130 can be provided on the movable member 104 to slide along the base member 120 in accordance with movement of the movable member 104 in the first direction DX.

The configuration of the cover attachment portion 72 can be changed in any manner. In a first example, the hooks 72A are provided on the outer surface 60A of the battery unit 60, and the loops 72B are provided on the inner surface 70A of the cover 70. In a second example, the cover attachment portion 72 includes two magnets having different polarities. In this case, one of the magnets is provided on the inner surface 70A of the cover 70, and the other magnet is provided on the outer surface 60A of the battery unit 60.

The configuration of the contact portions 55 and 86 can be changed in any manner. In one example, the contact portions 55 and 86 are provided to rotate relative to the support member 46. More specifically, the contact portions 55 and 86 are provided to be movable in the first direction DX by rotating about an axis extending in the second direction DY. In this case, the configuration of the cam mechanisms 56 and 90 is changed, accordingly.

Figure 18:
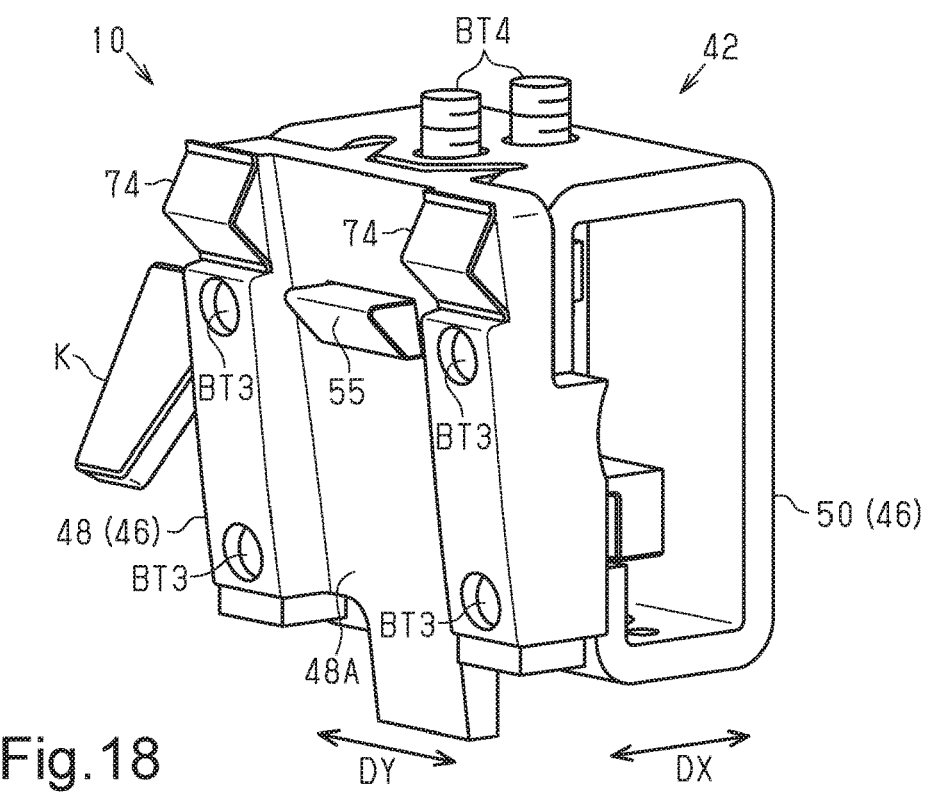
FIG. 18 is a perspective view showing a modification of a second holding portion.

The configuration of the second holding portion 42 of the first embodiment can be changed in any manner. In one example, as shown in FIG. 18, the second holding portion 42 includes a second biasing member 74 biasing the battery unit 60 toward the first holding portion 12 instead of the second biasing member 44 (refer to FIG. 6). The second biasing member 74 includes metal that is provided on the second support surface 48A to contact the second end 66 of the battery unit 60. The second biasing member 74 has a lower friction coefficient than the second biasing member 44. The second biasing member 74 includes, for example, a plate spring. In this modification, two of the second biasing members 74 are provided. The second biasing members 74 are provided on the second support surface 48A, for example, so that the through hole 48B is located between the second biasing members 74 in the second direction DY. The second contact members 52 can be coupled to the second biasing member 74 so that the second contact surfaces 52A contact the second end 66 of the battery unit 60. The same modification can be applicable to the second holding portion 82 of the second embodiment.

The shape of the engagement portion 18 can be changed in any manner. In one example, the engagement portion 18 can include a recess. Additionally, the first engagement portion 20 or the second engagement portions 22 can include a recess.

The connector 16 can be omitted from the movable members 14 and 104. The arrangement of the connector 16 can be changed in any manner. In this case, the connector 16 is provided to project from the second support surface 48A of the support member 46. Instead of projecting from the first support surface 104A of the movable member 104, the connector 16 can be recessed from the first support surface 104A of the movable member 104. The connector 16 can include any one of a male connector and a female connector.

The configuration of the first holding portion 12 can be changed in any manner. In a first example, the guide structure 36 is omitted from the first holding portion 12. In a second example, the surrounding wall 26 is omitted from the first holding portion 12. In a third example, the base member 30 is omitted from the first holding portion 12. In the third example, the movable member 14 is coupled to the down tube DT in a state movable relative to the frame A1 of the human-powered vehicle A.

The configuration of the battery holder 10 can be changed in any manner. In one example, the second holding portion 42 is omitted from the battery holder 10. The arrangement of the opening DT2 in the down tube DT can be changed in any manner. In one example, the opening DT2 is provided at an upper side and a lateral side of the human-powered vehicle A in a state in which the human-powered vehicle A is located on a level ground. The same modification is applicable to a case in which the battery component 1 is provided on an element differing from the down tube DT.

The arrangement of the battery component 1 can be changed in any manner. In one example, the battery component 1 is provided on an outer surface of the down tube DT. More specifically, the battery component 1 is provided on the outer surface of the down tube DT so that the battery holder 10 and the battery unit 60 are exposed to the exterior. In this example, the accommodation space DT1 and the opening DT2 can be omitted from the down tube DT. The same modification can be applicable to a case in which the battery component 1 is provided on an element differing from the down tube DT.

The type of the human-powered vehicle A may be changed in any manner. In a first example, the human-powered vehicle A is a road bike, a mountain bike, a cross bike, a city bike, a cargo bike, and a recumbent bike. In a second example, the human-powered vehicle A is a kick scooter.

What is claimed is:

1. A battery holder comprising:
   a first holding portion that supports a first end of a battery unit while in an installed state where the battery unit is held by the battery holder, the first holding portion including
   a movable member including a first support surface that contacts the first end of the battery unit while in the installed state, the movable member being movable relative to a frame of a human-powered vehicle while in a mounted state where the battery holder is mounted to the frame of the human-powered vehicle, the movable member further including a connector connected to a terminal provided on the first end of the battery unit while in the installed state, and
   a first biasing member that biases the movable member toward the battery unit.

2. The battery holder according to claim 1, wherein the movable member further includes an engagement portion that is engaged with the first end of the battery unit while in the installed state.

3. The battery holder according to claim 1, wherein the first biasing member includes a first elastic member.

4. The battery holder according to claim 3, wherein the first elastic member includes rubber.

5. The battery holder according to claim 3, wherein a second holding portion includes a second biasing member that biases the battery unit toward the first holding portion.

6. The battery holder according to claim 1, wherein the first holding portion further includes a base member attached to the frame of the human-powered vehicle while in the mounted state, and the first biasing member is provided between the base member and the movable member.

7. The battery holder according to claim 6, wherein the first holding portion further includes a support structure that supports the first biasing member between the base member and the movable member.

8. The battery holder according to claim 7, wherein the support structure includes a first support provided on the movable member and a second support provided on the base member.

9. The battery holder according to claim 6, further comprising a coupling structure that couples the movable member and the base member so that the movable member is movable relative to the base member.

10. The battery holder according to claim 6, wherein the first holding portion further includes a guide structure that guides movement of the movable member.

11. The battery holder according to claim 10, wherein the guide structure includes a groove provided on one of the movable member and the base member and an insertion portion provided on the other one of the movable member and the base member, and the insertion portion is inserted into the groove so that the movable member moves relative to the base member.

12. The battery holder according to claim 6, wherein the movable member further includes a first facing surface that faces the base member, the base member includes a second facing surface that faces the movable member, and the first facing surface and the second facing surface are spaced apart by a gap in a state in which the battery unit is not held by the first holding portion.

13. The battery holder according to claim 6, wherein the first holding portion further includes a movement restriction member provided between the movable member and the base member in a third direction perpendicular to a first direction that extends in a longitudinal direction of the battery unit to restrict movement of the movable member in the third direction.

14. A battery holder comprising:
a first holding portion that supports a first end of a battery unit while in an installed state where the battery unit is held by the battery holder, the first holding portion including
a movable member including a first support surface that contacts the first end of the battery unit while in the installed state, the movable member being movable relative to a frame of a human-powered vehicle while in a mounted state where the battery holder is mounted to the frame of the human-powered vehicle,
a first biasing member that biases the movable member toward the battery unit,
a base member attached to the frame of the human-powered vehicle while in the mounted state, the first biasing member being provided between the base member and the movable member, and
a support structure that supports the first biasing member between the base member and the movable member, the support structure including a first support provided on the movable member and a second support provided on the base member,
the movable member being movable relative to the frame of the human-powered vehicle in a first direction that extends in a longitudinal direction of the battery unit while in the mounted state,
the movable member further including a pair of first sides facing each other in a second direction that is perpendicular to the first direction,
the base member including a pair of second sides facing each other in the second direction,
the first support being provided on each of the first sides, and
the second support being provided on each of the second sides.

15. A battery holder comprising:
a first holding portion that supports a first end of a battery unit while in an installed state where the battery unit is held by the battery holder, the first holding portion including
a movable member including a first support surface that contacts the first end of the battery unit while in the installed state, the movable member being movable relative to a frame of a human-powered vehicle while in a mounted state where the battery holder is mounted to the frame of the human-powered vehicle,
a first biasing member that biases the movable member toward the battery unit,
a base member attached to the frame of the human-powered vehicle while in the mounted state, the first biasing member being provided between the base member and the movable member, and
a coupling structure that couples the movable member and the base member so that the movable member is movable relative to the base member,
the coupling structure including a first coupling portion and a second coupling portion, and
the first coupling portion and the second coupling portion are being coupled together to couple the movable member and the base member.

16. The battery holder according to claim 15, wherein
the first coupling portion is provided on the movable member, and
the second coupling portion is provided on the base member.

17. The battery holder according to claim 16, wherein
at least one of the first coupling portion and the second coupling portion includes a snap-fit.

18. A battery holder comprising:
a first holding portion that supports a first end of a battery unit while in an installed state where the battery unit is held by the battery holder, the first holding portion including
a movable member including a first support surface that contacts the first end of the battery unit while in the installed state, the movable member being movable relative to a frame of a human-powered vehicle while in a mounted state where the battery holder is mounted to the frame of the human-powered vehicle,
a first biasing member that biases the movable member toward the battery unit,
a base member attached to the frame of the human-powered vehicle while in the mounted state, the first biasing member being provided between the base member and the movable member, and
a movement restriction member provided between the movable member and the base member in a third direction perpendicular to a first direction that extends in a longitudinal direction of the battery unit to restrict movement of the movable member in the third direction,
the movable member further including a first contact surface that contacts the movement restriction member, and
the movement restriction member being provided on the base member to slide along the first contact surface in accordance with movement of the movable member in the first direction.

19. The battery holder according to claim 18, wherein
the first contact surface is shaped as an arc that projects from the movable member toward the base member as viewed in a direction perpendicular to the first direction and the third direction.

20. A battery holder comprising:
a first holding portion that supports a first end of a battery unit while in an installed state where the battery unit is held by the battery holder, the first holding portion including
a movable member including a first support surface that contacts the first end of the battery unit while in the installed state, the movable member being movable relative to a frame of a human-powered vehicle while in a mounted state where the battery holder is mounted to the frame of the human-powered vehicle,
a first biasing member that biases the movable member toward the battery unit,
a base member attached to the frame of the human-powered vehicle while in the mounted state, the first biasing member being provided between the base member and the movable member, and
a movement restriction member provided between the movable member and the base member in a third direction perpendicular to a first direction that extends in a longitudinal direction of the battery unit to restrict movement of the movable member in the third direction, the movement restriction member being elastic.

21. The battery holder according to claim 20, wherein the movement restriction member includes rubber.

22. A battery holder comprising:

a first holding portion that supports a first end of a battery unit while in an installed state where the battery unit is held by the battery holder, the first holding portion including a movable member including a first support surface that contacts the first end of the battery unit while in the installed state, the movable member being movable relative to a frame of a human-powered vehicle while in a mounted state where the battery holder is mounted to the frame of the human-powered vehicle, a first biasing member that biases the movable member toward the battery unit, and a second holding portion that supports a second end of the battery unit while in the installed state, the second holding portion including a second biasing member that biases the battery unit toward the first holding portion.

23. The battery holder according to claim 22, wherein the second holding portion further includes a support member attached to the frame of the human-powered vehicle while in the mounted state, the support member includes a second support surface that contacts the second end of the battery unit while in the installed state, and the second biasing member is provided on the second support surface of the support member.

24. The battery holder according to claim 23, wherein the second holding portion further includes a contact member attached to the second biasing member so that a second contact surface contacts the second end of the battery unit while in the installed state, and the second contact surface of the contact member has a lower friction coefficient than the second biasing member.

25. The battery holder according to claim 23, wherein the second biasing member includes metal that is provided on the second support surface to contact the second end of the battery unit while in the installed state.

26. The battery holder according to claim 22, wherein the second biasing member includes a second elastic member.

27. The battery holder according to claim 26, wherein the second elastic member includes rubber.

\* \* \* \* \*